(12) United States Patent
Morgenstern

(10) Patent No.: US 6,729,577 B2
(45) Date of Patent: May 4, 2004

(54) TAIL-BRACED WING AIRCRAFT AND CONFIGURATIONS FOR ACHIEVING LONG SUPERSONIC RANGE AND LOW SONIC BOOM

(75) Inventor: John M. Morgenstern, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/006,505

(22) Filed: Dec. 6, 2001

(65) Prior Publication Data

US 2004/0056150 A1 Mar. 25, 2004

Related U.S. Application Data

(60) Provisional application No. 60/251,760, filed on Dec. 8, 2000.

(51) Int. Cl.[7] ............................................... B64C 27/22
(52) U.S. Cl. ...................... 244/45 R; 244/130; 244/47
(58) Field of Search ................................. 244/45 R, 87, 244/47, 35 R, 35 A, 215, 130; D12/333, 334, 335, 338

(56) References Cited

U.S. PATENT DOCUMENTS

| | | | |
|---|---|---|---|
| 1,264,037 A | | 4/1918 | Emmons |
| 1,453,830 A | | 5/1923 | Coakley |
| 2,406,625 A | | 8/1946 | Oglesby |
| 2,874,922 A | * | 2/1959 | Whitcomb .................. 244/130 |
| 3,834,654 A | | 9/1974 | Miranda |
| 3,942,747 A | | 3/1976 | Wolkovitch |

(List continued on next page.)

FOREIGN PATENT DOCUMENTS

FR 2579169 * 3/1985 .................. 244/46

OTHER PUBLICATIONS

Darden, "Sonic Boom Theory: Its Status in Prediction and Minimization", *J. Aircraft*, Jun. 1977, pp. 569–576, vol. 14, No. 6.
Darden, "Sonic–Boom Minimization with Nose Bluntness Relaxation", NASA Technical Paper 1348, 1979.
Demeis, "Joined Wing: Child of the Computer", *Aerospace America*, Apr. 1985, pp. 70–73, vol. 23, No. 4.
Mack et al., "A Methodology for Designing Aircraft to Low Sonic Boom Constraints", NASA Technical Memorandum 4246, 1991.
Kroo et al., "Aerodynamic and Structural Studies of Joined–Wing Aircraft", Jan. 1991, pp. 74–81, vol. 28, No. 1.
Gallman et al., "Structural Optimization for Joined–Wing Synthesis", *Journal of Aircraft*, 1996, pp. 214–223, vol. 33, No. 1.
Seebass et al., "Sonic Boom Minimization Revisited", AIAA Paper, Jun. 1998, pp. 1–14.
Warwick, "Supersonic and Silent", *Flight International*, Sep. 2000, pp. 46–47, vol. 158, No. 4746.

*Primary Examiner*—Michael J. Carone
*Assistant Examiner*—L. Semunegus

(57) ABSTRACT

The present invention provides improvements for supersonic aircraft, joined-wing aircraft and sonic boom reduction, separately and in combination, for long range supersonic cruise aircraft with reduced sonic boom loudness. Several designs for integrating and supporting a propulsion system with reduced transonic and supersonic drag are disclosed. A tail-braced wing configuration for supporting a propulsion system installation with minimum draft interference and reduced structural weight is provided. A method for designing an improved wing in the presence of a propulsion system supersonic pressure disturbance is also provided. The drag reducing features synergistically help in meeting a shaped sonic boom minimized lift and area distribution. The tail-braced wing design and other asymmetric area distribution features further reduce the shaped sonic boom minimum. For example, boom pressure at audible frequencies may be reduced 30 to 100 times for business jets.

47 Claims, 22 Drawing Sheets

U.S. PATENT DOCUMENTS

| | | |
|---|---|---|
| 3,981,460 A | 9/1976 | Ratony |
| 3,985,317 A | 10/1976 | Geraci et al. |
| 4,053,125 A | 10/1977 | Ratony |
| 4,090,681 A | 5/1978 | Zimmer |
| 4,146,199 A | 3/1979 | Wenzel |
| 4,365,773 A | 12/1982 | Wolkovitch |
| 4,390,150 A * | 6/1983 | Whitener .................. 244/45 R |
| 4,541,593 A | 9/1985 | Cabrol |
| D292,203 S | 10/1987 | Ligeti |
| D292,911 S | 11/1987 | Argondezzi |
| 4,856,736 A | 8/1989 | Adkins et al. |
| D304,821 S | 11/1989 | Ratony |
| D308,043 S * | 5/1990 | Butler ....................... D12/331 |
| 5,046,684 A | 9/1991 | Wolkovitch |
| 5,503,352 A | 4/1996 | Eger |
| 5,615,846 A | 4/1997 | Shmoldas et al. |
| 5,740,984 A | 4/1998 | Morgenstern |
| 5,899,409 A | 5/1999 | Frediani |
| 5,899,410 A | 5/1999 | Garrett |
| 5,899,413 A | 5/1999 | Hager et al. |
| D417,184 S | 11/1999 | Hartmann et al. |

\* cited by examiner

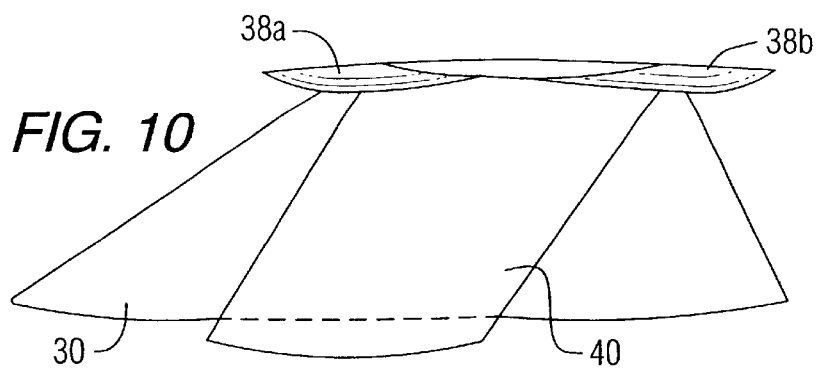
FIG. 10
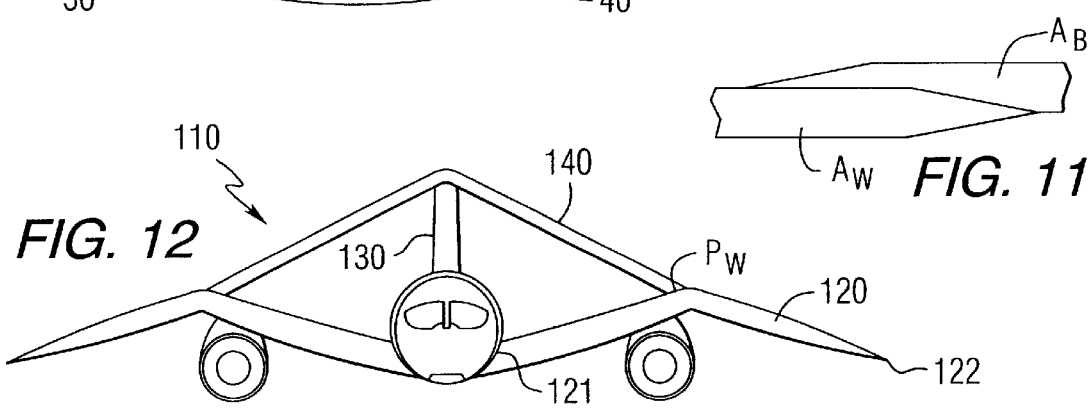
FIG. 11
FIG. 12
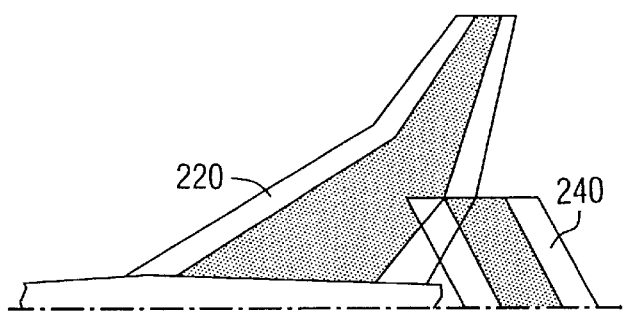
FIG. 13
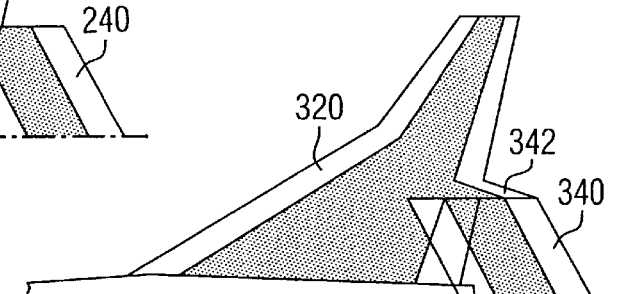
FIG. 14
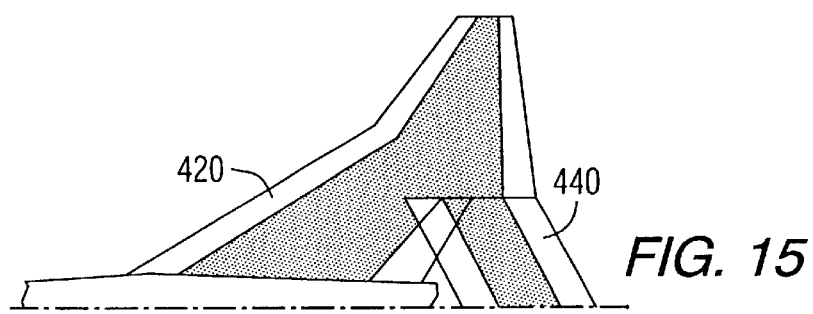
FIG. 15

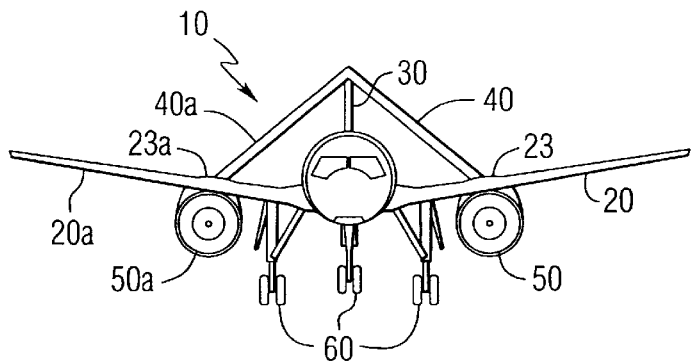
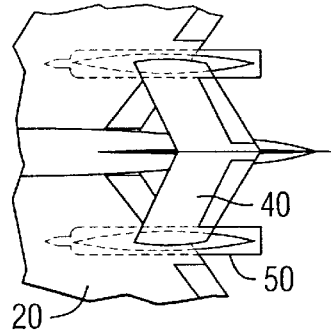
FIG. 16a  FIG. 16b
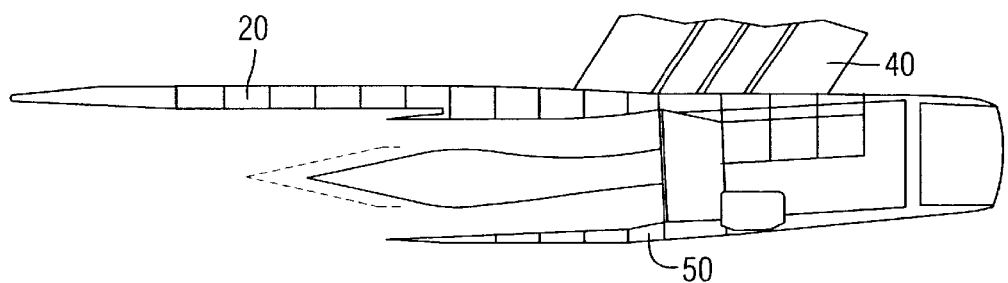
FIG. 16c
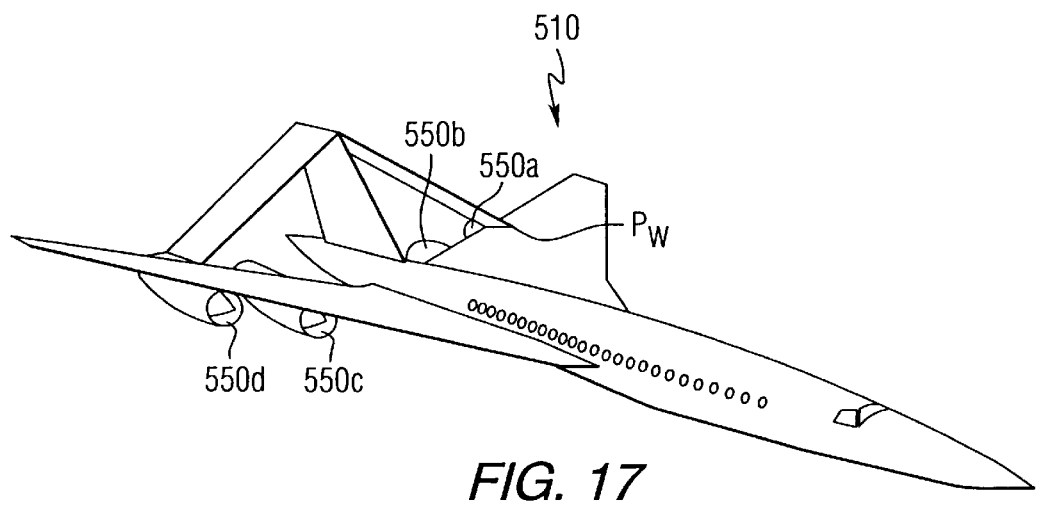
FIG. 17

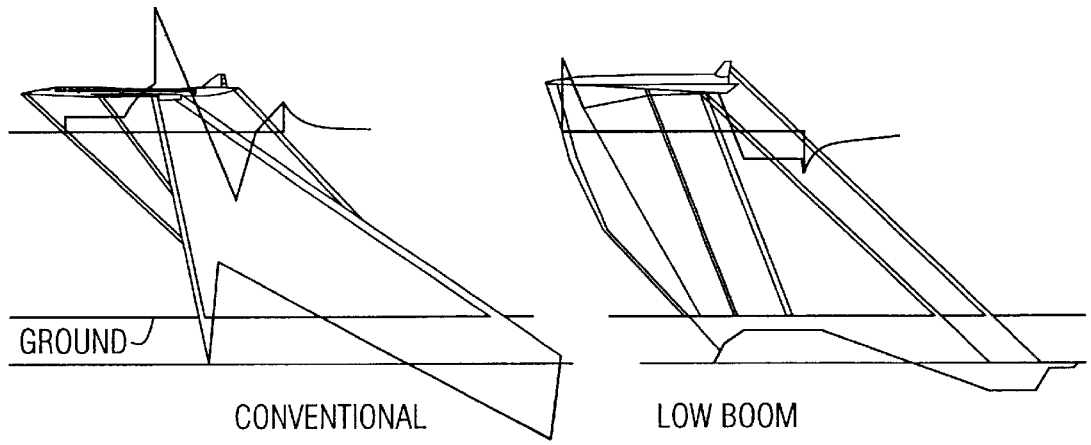
FIG. 25a  CONVENTIONAL
FIG. 25d  LOW BOOM
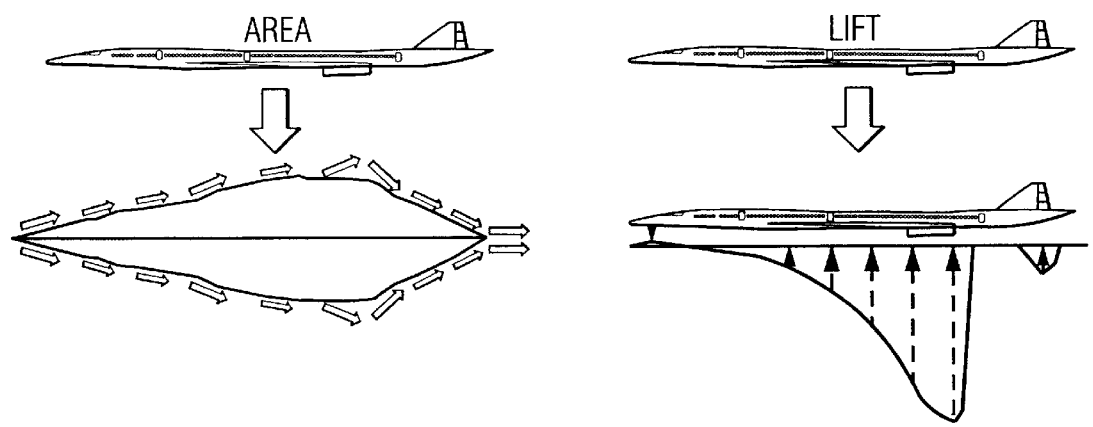
FIG. 25b  AREA
FIG. 25c  LIFT

TAIL-BRACED WING AIRCRAFT AND CONFIGURATIONS FOR ACHIEVING LONG SUPERSONIC RANGE AND LOW SONIC BOOM

CROSS REFERENCE TO RELATED APPLICATION

This application claims the benefit of U.S. Provisional Application Ser. No. 60/251,760 filed Dec. 8, 2000.

BACKGROUND OF THE INVENTION

1. Field of the Invention

The present invention relates to supersonic aircraft, joined-wing aircraft and sonic boom reduction, separately and in combination, for long range supersonic cruise aircraft with reduced sonic boom loudness.

2. Description of Related Art

A number of prior patents and technical reports have individually described technologies for joined-wings, low supersonic drag and sonic boom minimization. Further design studies and actual supersonic aircraft revealed shortcomings that reduced and eliminated the perceived advantages of such designs. Although tandem and connected wing designs have been proposed in prior patents, such designs are unfavorable because the wing downwash on the following wing and pitch stability were not taken into account. Downwash created by one wing reduced the lifting efficiency of any nearby or following wing, requiring a greater angle-of-attack to generate the same lift. This reduction in lifting efficiency increased induced drag and reduced pitch stability. Trailing wings carried very little lift or often a down load to trim an aircraft with the center-of-gravity far enough forward for positive pitch stability. Current artificial stability technology allows the trailing wing lift to be slightly increased, but also increases development cost. Downwash is the main reason why biplane and canard airplanes were abandoned and now serve only in applications not primarily based on efficiency.

Additionally, prior patent designs were generally focused on subsonic applications rather than supersonic applications. Box-wings and tip-connected joined-wings claim vortex drag reductions as their primary improvement. However, the contribution of vortex drag to total drag and the vortex drag benefit of interconnection diminish as speed increases supersonically. Another important requirement of supersonic applications is the need to keep cross-sectional area distributions as low as possible and minimize second derivative changes, also known as area ruling, to reduce wave drag. Blunt and unswept wings, blunt connecting elements and superimposed connections have rapid cross-sectional area changes that produce high wave drag supersonically. Supersonic surfaces and bodies need to be sharp or swept greater than the Mach cone angle and need low thickness-to-chord ratios. The Mach cone angle is defined as the inverse cosine of 1/Mach, and is 60 degrees at Mach 2.

Finally, most prior patent designs that address sonic boom only reduce the sonic boom due to aircraft volume or use energy to alter boom pressures. Unfortunately, reducing the sonic boom due to volume results in a sonic boom due to lift that is typically stronger than the combined lift and volume boom. This counter-intuitive result occurs because the lift is concentrated in a length shorter than the vehicle length and the typical area ruled volume superimposes an expansion where the lift is located, mitigating the lift. As for energy techniques, the energy in the boom pressures is equivalent to the entire propulsion system output that balances them, suggesting impractical power requirements.

To help understand some of the benefits achieved in accordance with the present invention, the relevant shortcomings of prior designs, for the present supersonic application, are described below.

U.S. Pat. No. 1,264,037 to Emmons teaches a biplane aircraft with a sweptback forward wing connected to a sweptforward rear wing also connected to an additional mid-fuselage fin. The wings are connected by vertical struts, which cannot provide joined-wing 20¢: in-plane stiffening or box-wing vortex induced drag reduction.

U.S. Pat. No. 1,453,830 to Coakley teaches multiple connected wings with dihedral for the lower wings and anhedral for the upper wings and vertical struts, creating a stiff structure that carries loads in-plane. However, it is only suitable for low speed flight having its connections superimposed, no wing sweep and an excess of bracing struts and wires.

U.S. Pat. No. 2,406,625 to Oglesby teaches multiple, unswept wings of alternating anhedral and dihedral connected at their tip to a common tube and connected at their root to a fuselage. This is recognized to form a truss arrangement, reducing wing loads.

However, the lack of sweep leads to a long tip-connecting tube that would have significant weight and friction drag. Multiple trailing wings have increasing drag due to increasing downwash.

U.S. Pat. No. 2,461,805 to Barker teaches dual wings and dual tails of differing height and tandem fore/aft position at their root and connected at their tips by an interconnecting structure that blends the forward tip into the aft tip. While this does carry loads in-plane, greatly increasing strength and rigidity, the interconnecting structure creates a large spanwise blockage of the flow at the tips unsuitable for compressible flow regimes (Mach>0.5) and creates redundant, closely-coupled surfaces increasing friction and interference drag.

U.S. Pat. No. 2,567,294 to Geraci teaches a tail-less bi-plane in a box-wing arrangement also with dual propeller box-prop arrangement. While there would be a vortex drag reduction, the wings are close causing high interference (downwash) and the vertical interconnecting structures cannot transfer loads in-plane for less strength and rigidity benefit. Further, both wings are highly sweptback, resulting in little torsional stiffness improvement leading to increased weight to resist flutter and aeroelastic elevon reversal. The interconnecting fins are also superimposed with the wings, creating increased area unsuited for compressible flow regimes.

U.S. Pat. No. 3,834,654 to Miranda teaches a box-wing with three relevant (to this patent) advantages. First, in having a rearwardly swept wing connected at the tip, by a vertical fin, to a forwardly swept wing, increased torsional stiffness eases aeroelastic problems. However, the box-wing is not claimed to resist lift loads in-plane, so it is more similar structurally to dual cantilevered wings. Second, reduced transonic and supersonic wave drag is attributed to the greater length over which the wing volume is spread. As a caveat, the patent notes that the superposition of wing/fin connections could increase shock strength and drag, and therefore, suggests: rounding the corners, adding the volume of a streamlined center body or using boundary layer control through suction, blowing or vortex generators. Third, the vertical separation of the wings theoretically makes possible a 40% induced drag reduction subsonically. Unfortunately, this improvement is greatly reduced with practical longitudinal stability requirements. A stable box-wing as shown requires a download from the aft wing to trim and current artificial stability systems would only allow a small upload, so trim drag and flight control system impacts must be considered when assessing benefits.

U.S. Pat. No. 3,942,747 to Wolkovitch teaches a canard swept back and up connected at its tip to an unswept wing, both canard and wing attached to a fuselage. The design is suited to a low speed, ultralight-type aircraft stressing simple construction and rugged design at the expense of performance. The design is in particular claimed suited to flexible lifting portions made material such as canvas.

U.S. Pat. No. 3,981,460 to Ratony teaches tip-joined, counter-swept wings with the upper wing being free from fuselage and vertical fin bracing, increasing load and wing weight. The acute angle and wing superposition at the tip results in high interference and wave drag in compressible flow regimes. Further, the short distance between the control surfaces and the center-of-gravity results in a large trimmed loss of flap lift and increase in drag. Finally, the preferred embodiment describes that elimination of the wing tip vortex eliminates sonic boom. Current theory attributes the formation of sonic boom to the (downward momentum imparted to the air to generate) lift and the volume disturbance. As this design shows no area ruling and a relatively short vehicle length, the theory would indicate greater than average sonic boom at the ground.

U.S. Pat. No. 3,985,317 to Geraci and DeLouise teaches a compact, unswept, staggered box-wing aircraft not suitable for high speed flight.

U.S. Pat. No. 4,053,125 to Ratony teaches a sweptback forward wing joined at the tip to a sweptforward aft wing, both wings mounted on the fuselage with an aft T-tail. The wings do form an interconnected structure capable of carrying loads in-plane for lighter weight. The wings are superimposed at their tips and drawings indicate an attachment structure that reduces channel closure but add further tip volume, causing increased wave drag.

U.S. Pat. No. 4,090,681 to Zimmer teaches both sweptback upper and lower wings of opposing dihedral, joined at their tips with an aft tail. The upper wing is swept more so that its trailing edge is positioned approximately over the leading edge of the lower wing. This arrangement is well illustrated as being able to carry loads in-plane for lighter weight wing structure. However, the tips are connected through a blunt leading edge plate that would have high stress. In addition above about Mach 1.4, the stagger shown between the wings would cause the growth of the forward wing volume to start aligning with the aft wing volume growth, greatly increasing wave drag.

U.S. Pat. No. 4,146,199 to Wenzel teaches a low mounted sweptback wing connected at the tips to a high mounted sweptforward wing extending from either side of a lifting body fuselage. The design is not suited for high speeds or altitudes requiring pressurization with a rectangular fuselage cross-section. As the lifting body is very low aspect ratio with very short end plates, induced drag would be very high for the lift developed on the fuselage. The wing tip connections are staggered and separated by a blending structure, reducing interference drag but resulting in high stresses in the blending structure.

U.S. Pat. No. 4,365,773 to Wolkovitch teaches a wing connected to an aft fin and sweptforward connecting its tip, through a streamlined element, to a sweptback wing in the elevational plane of the wing. The sweptback wing is attached to the fuselage at a lower elevation than the sweptforward wing. The higher, fin-mounted wing opens up the angle at the wings' connections. All drawings show high aspect-ratio (span divided by chord) wings for subsonic applications. Large streamlined members are shown for staggered wing connections. These lighten the weight for load transfer but incur a friction area increase. The streamlined members are also shown with their maximum thickness aligned with the sweptback wing maximum thickness, and fin-wing connections are superimposed. Both superpositions reduce the drag divergence Mach number and increase transonic and supersonic wave drag. The claims further teach that the structural box should be strengthened in opposite corners whose diagonal is more out-of-plane with the connecting wing. However, the structure of the stiffening would need to be different for multi-spar wings with mid-span connections.

U.S. Pat. No. 4,541,593 to Cabrol teaches upper and lower wings connected at the tips and hingedly secured to the fuselage. The hinge connection reduces the wing's resistance to compressive buckling, resulting in an increase in wing weight relative to a stiff connection. The wings' lift is also maximized at mid-span locations, which increases stress and wing weight.

U.S. Design Pat. No. 292,203 to Legeti shows an aircraft very similar to U.S. Pat No. 3,942,747 to Wolkovitch except for a box-wing interconnection and ducted pusher prop. The design is not suited for flight in compressible flow regimes.

U.S. Design Pat. No. 292,911 to Argondezzi shows a box-wing arrangement similar to U.S. Pat. No. 3,834,654 to Miranda except for an additional unswept wing also attached to the vertical interconnecting fins between the upper and lower wings. The design is not suited for flight in compressible flow regimes.

U.S. Pat. No. 4,856,736 to Adkins, McDonald and Sivertsen teaches a front, sweptback wing mounted high and an aft sweptforward wing mounted low on the fuselage like patent 4,053,125 to Ratony except that the wings are joined at the tip in tandem with an interconnecting structure to link the wing structures. While reducing interference drag of a superimposed wing tip connection, the instability and inability to efficiently lift from the aft wing and trim the aircraft eliminate much of the claimed advantages.

U.S. Design Pat. No. 304,821 to Ratony shows an arrangement similar to design U.S. Pat. No. 292,911 to Argondezzi except that the wing tips are joined in tandem to a common streamlined member with triple winglets. The unswept center wing and pusher props are not suited for flight in compressible flow regimes.

U.S. Pat. No. 5,046,684 to Wolkovitch teaches an aircraft like his U.S. Pat. No. 4,365,773 with the addition of pivoting propulsion devices mounted and braced at the wing tip connection. It teaches improvements for short and vertical takeoff and landing designs for subsonic cruise speeds.

U.S. Pat. No. 5,503,352 to Eger teaches a low fineness ratio, box-wing aircraft with a ducted pusher prop not suited for flight in compressible flow regimes.

U.S. Pat. No. 5,615,846 to Shmoldas, Hutchings and Barlow teaches a planer joined-wing with a mid-span connection as a means of actuating an extendable wing through an umbrella-like action. The planer wings cannot provide bracing of lift loads.

U.S. Pat. No. 5,750,984 to Morgenstern teaches a supersonic aircraft with a moveable control surface at the nose and a sonic boom minimized area/lift distribution. The control surface is used to regulate the strength of the boom minimized, triangular, nose pressure spike to match non-standard conditions or to eliminate the spike drag penalty during over water operation where somewhat louder boom has been accepted.

U.S. Pat. No. 5,899,409 to Frediani teaches a box-wing aircraft like U.S. Pat. No. 3,834,654 to Miranda with the addition of a greater than 400,000 kg maximum take-off weight and fuselage with multiple passenger decks upon which both wings are mounted. The smaller vertical separation of the fuselage-mounted wings reduces the induced drag benefits and amplifies previous comments regarding stability reduction or increased trim drag.

U.S. Pat. No. 5,899,410 to Garrett teaches coplaner joined wings. Since the wings are coplaner, structural bracing of lift load is not possible, and therefore, is carried like cantilevered wings. Joints show coplaner fairings that increase area at connections increasing transonic and supersonic drag.

U.S. Design Pat. No. 417,184 to Hartmann et al. discloses an ornamental design for a supersonic business jet.

In addition to the above-noted patent literature, joined-wing optimization studies have been performed for a transonic (Mach~0.8) transport aircraft application. These studies focused on configuring a joined-wing for optimum aerodynamic and structural trade-offs, and determined that the weight savings of inboard joint locations outweighed the aerodynamic advantages of tip joint locations. They also found that a download on the aft wing or tail was needed to trim the aircraft 20 percent statically stable. They further determined that their optimized joined-wing actually performed worse than the conventional design for this application. However, applications with a long wing chord, short distance between wing and tail, very low wing t/c and no maximum lift (CLmax) limiting would be more favorable for joined-wing aircraft. Supercruise applications typically have all of these characteristics.

High supersonic L/D technology also is documented in technical literature. The literature describes L/D improvements due to the area-rule, optimum lift distribution including nacelle interference, wing leading edge sweep-back greater than the Mach cone angle, high trailing edge notch ratio (longitudinal distance the wing trailing edge root is ahead of the tip versus total wing length), and podded nacelles mounted under the wing behind the wing maximum thickness. Unfortunately, later more in-depth NASA SST and HSCT programs proved these wing and nacelle features to be structurally heavy and even infeasible. The high wing sweeps and resulting long structural load paths are poor at resisting aeroelastics and flutter. Moreover, propulsion nacelles cantilevered behind the maximum thickness increase flexure. NASA programs were unable to get net aero/structural improvements from positive notch ratio and even had to minimize the portion of leading edge sweep-back greater than the Mach cone angle to improve subsonic performance. The inability to take advantage of these high L/D technologies was due to the low stiffness of a conventional cantilevered wing.

Since the nacelle is generally the most concentrated source of pressure drag, recovering its drag on the other surfaces of the vehicle has been proposed by designers. The nacelle pressure drag may be recovered by altering the wing camber slope. Previous to this technique, flow calculations without nacelles were used to determine the wing camber slopes, or flexure, for a minimum drag, lift distribution. It was noticed that when nacelle pressures impinged on the wing, the lift distribution changed, and it was speculated that the wing should be, at least partially, reflexed to restore the original minimum drag, lift distribution. Nacelle pressure disturbance impingement calculations were made using an axisymmetric equivalent body and linearized theory. When the angle of the wing camber slopes was changed (reflexed) to restore the original lift distribution, the drag was improved, but the drag was reduced the most when only one-half to two-thirds of the slope change was used. In wind tunnel tests, recovering the nacelle pressure drag through wing reflexing often resulted in half or less of the improvement expected due to additional inaccuracies in calculation and manufacturing resolution. Wing reflexing diminished in importance as a design technique due to these marginally effective results.

Shaped sonic boom, as the term is used herein, specifically refers to altering the source pressure disturbance such that a non N-wave shape is achieved at the ground. Shaping sonic boom is capable of loudness reductions of 15–20 dB or higher, reductions with no additional energy requirement (beyond that already needed for flight), and successful demonstrations beyond the near-field in wind tunnel tests. The key to understanding shaped sonic boom, using shaping to minimize loudness and applying the concept to practical aircraft designs, starts with understanding how aircraft pressure disturbances change as they propagate to the ground.

Shaped sonic booms are only achieved deliberately. No existing aircraft creates a shaped sonic boom that persists more than a fraction of the distance to the ground while flying at an efficient cruise altitude. Typical source pressure disturbances quickly coalesce into an N-wave, a shape with the largest shock magnitudes possible from a given disturbance. Coalescence occurs because the speed at which the pressure disturbance propagates varies slightly, proportional to its pressure and thereby temperature (speed of sound=sqrt ($\gamma RT$). Since the front of a supersonic aircraft generates an increase in ambient pressure, and the rear generates a decrease in pressure, the variation in propagation speed causes aircraft pressure disturbances to stretch-out as they propagate to the ground. As the disturbances stretch-out they also tend to coalesce because shocks travel at halfway between the speed of the lower pressure ahead and higher pressure behind them. In general, to keep pressures from coalescing the pressures at the nose must have a large compression and the pressures at the tail must have an expansion, with the pressures in between constrained to weak compressions and expansions. This causes the ends of the signature to stretch out faster than the pressures between them, resulting in non N-wave sonic boom at the ground.

Acoustic studies have shown that sonic boom loudness at audible frequencies correlates with annoyance. Meaning that to achieve acceptable supersonic flight over land, the loudness of a sonic boom needs to be minimized. The audible frequencies in a sonic boom occur in the rapid pressure changes, or shocks, at the beginning and end of the typical "N" waveform. Shocks become quieter with decreasing magnitude and with increasing rise time (of the pressure change). However, the shock rise time is inversely proportional to its magnitude (although there is a large variability around this relationship in measurements). Therefore, the audible sound pressure goes down dramatically with decreasing shock magnitude. For example, two shocks of half the pressure of a single shock are about 6 dB quieter, and one shock of half the pressure is about 9 dB quieter. In summary, minimizing shock magnitude minimizes loudness.

The lowest shock magnitude from a shaped sonic boom may be determined theoretically. Sonic boom minimization methodology calculates the minimum shock strength possible subject to a compression slope input (fraction below minimum coalescence slope, 0 for N-wave, 1 for flat-top signature) for a given vehicle length and weight at the desired flight conditions. This is the lowest shock magnitude possible, assuming that any compression between the shocks must have a constant, linear slope. Any shaped sonic booms not corresponding to a minimized source pressure distribution, like those with multiple front or rear ground shocks, is basically using the same ideas (weak enough pressures between the ends to prevent shock coalescence) with a non-optimally minimized distribution.

The minimized source pressure distribution (non-dimensionalized as an f-function) and the corresponding equivalent area distribution may be calculated. Equivalent area is a term that is defined as the axisymmetric Mach angle-cut area distribution needed to generate a corresponding pressure distribution. A given lift distribution can be converted into a corresponding equivalent area distribution. Equivalent area provides a more geometric way to examine the design consequences of a sonic boom minimized pressure distribution. A shortcoming of sonic boom minimization attempts is that they only consider minimization directly below the aircraft, instead of a more general approach of how to simultaneously reduce sonic boom off to either side and directly under the flight path.

The present invention has been developed in view of the foregoing, and to address other deficiencies of the prior art.

SUMMARY OF THE INVENTION

The present invention provides improvements to joined-wing aircraft and sonic boom minimization that are necessary for a supersonic application.

An embodiment of the present invention provides a tail-braced wing aircraft capable of long supersonic cruise range.

Another embodiment of the present invention provides sonic boom minimization, which is a technology for altering the shape of the boom waveform to minimize audible higher frequency sounds. This is achieved by tailoring the area and lift distribution. Loudness reductions of 30 times (audible pressure reduction or 15 dBA) or higher may be achieved.

Relative to the prior designs noted above, the present designs may reduce structural weight of joined-wings, reduce wave drag from the joints, reduce supersonic induced drag through the use of supercruise optimized lifting surface shape and load distribution and/or improve the shape of the minimized boom nose pressure spike and nose shape without regulating the strength of the spike.

An aspect of the present invention is to provide an aircraft comprising a fuselage, a swept-back wing having a wing root connected to the fuselage, a fin mounted on an upper surface of the fuselage at a rear portion of the aircraft, and a bracing tail. The bracing tail has a bracing tail tip connected to the wing inboard of a tip of the wing, and a bracing tail root connected to the fin at a higher point vertically than the connection between the wing root and the fuselage. The connection between the wing and the bracing tail tip comprises means for maintaining a substantially constant area distribution, i.e., the area distribution is more constant than the distribution for a separate wing and bracing tail.

Another aspect of the present invention is to provide an aircraft comprising a fuselage, a swept-back wing having a wing root connected to the fuselage, a fin having a fin root mounted on an upper surface of the fuselage at a rear portion of the aircraft, and a bracing tail having a bracing tail tip connected inboard of a tip of the wing at a point that is greater than 50 percent of the distance from the wing root to the wing tip, and a bracing tail root connected to the fin at a point that is greater than 20 percent of the distance from the fin root to a tip of the fin.

A further aspect of the present invention is to provide a supersonic cruise aircraft comprising lift and trim surfaces, and a propulsion system capable of generating a non-axisymmetric supersonic pressure disturbance that impacts the lift and/or trim surfaces, wherein the lift and/or trim surfaces define a camber line having a slope selected to cancel about one half of the supersonic pressure disturbance.

Another aspect of the present invention is to provide a supersonic aircraft comprising a fuselage, a swept-back wing connected to the fuselage, a fin connected to the fuselage, and a bracing tail connected to the wing and fin, wherein the fuselage comprises a blunt nose having a camber line that slopes upward toward the front of the aircraft.

A further aspect of the present invention is to provide a supersonic cruise aircraft comprising a body, and a lifting surface mounted on the body, wherein the aircraft has a combined lift/area that produces a shaped sonic boom minimized distribution.

These and other aspects of the present invention will be more apparent from the following description.

BRIEF DESCRIPTION OF THE DRAWINGS

FIG. 10 is a partially schematic side view of the connection between an aircraft fin and a bracing tail in accordance with a further embodiment of the present invention.

FIG. 11 schematically illustrates overlapping wing and bracing tail cross-sectional areas.

FIG. 12 is a front view of a supersonic aircraft in accordance with another embodiment of the present invention.

FIGS. 13–15 are top views illustrating various connections between aircraft wings and bracing tails in accordance with embodiments of the present invention.

FIG. 16a is a front view of the supersonic aircraft illustrated in FIG. 1.

FIG. 16b is a top view of the rear portion of the supersonic aircraft of FIG. 16a.

FIG. 16c is a sectional side view of a portion of the aircraft of FIG. 16a, illustrating a nacelle mounted under the wing of the aircraft.

FIG. 17 is an isometric view of a supersonic aircraft in accordance with another embodiment of the present invention.

FIG. 18b is a front view of the aircraft of FIG. 18a.

FIG. 18c is a side view of the aircraft of FIG. 18a.

FIG. 25a illustrates an N-shaped sonic boom profile for a conventional aircraft.

FIGS. 25b and 25c illustrate area and lift characteristics axial contribution to sonic boom.

FIG. 25d illustrates a low sonic boom profile achieved in accordance with the present invention sonic boom minimization.

FIG. 31b illustrates non-planer low sonic boom advantages for the aircraft of FIG. 31a.

FIG. 36b is a front view of the aircraft of FIG. 36a.

FIG. 36c is a side view of the aircraft of FIG. 36a.

DETAILED DESCRIPTION OF THE INVENTION

This invention relates to a tail-braced wing aircraft with long supercruise range and low sonic boom loudness. This description provides details of embodiments that could be an integrated design with several variations for a synergistic implementation, but the configurations may be utilized individually or in other combinations in different flight regimes and for different applications. To help illustrate aspects of the present invention, the configurations are described in categories of tail-braced wings, supercruise range improvements and sonic boom reductions. The combinations described herein are meant to better illustrate the benefits of the configurations through their interrelations, without limiting the application to an integrated design.

As used herein, the term "area distribution" means the magnitude of the cross-sectional area as a function of axial distance from the nose down the length of the vehicle. "Substantially constant area distribution" means that the reduction in cross-sectional area of one component is offset by the increase in area of the following component. "Staggered in tandem" means that the components are connected one behind the other streamwise, without superimposing their chordwise portions of maximum thickness at the same axial location. "Shaped sonic boom minimized distribution" means that the sum of the total vehicle area distribution and the equivalent area due to lift, a.k.a. combined lift/area distribution, matches the distribution calculated by specified equations for achieving minimized sonic boom, as more fully described herein. "Excursions below the lift/area distribution" occur when the sum of the cross-sectional area and the equivalent area due to lift at a particular axial location are less than the shaped sonic boom minimized distribution at that location.

Figure 1:
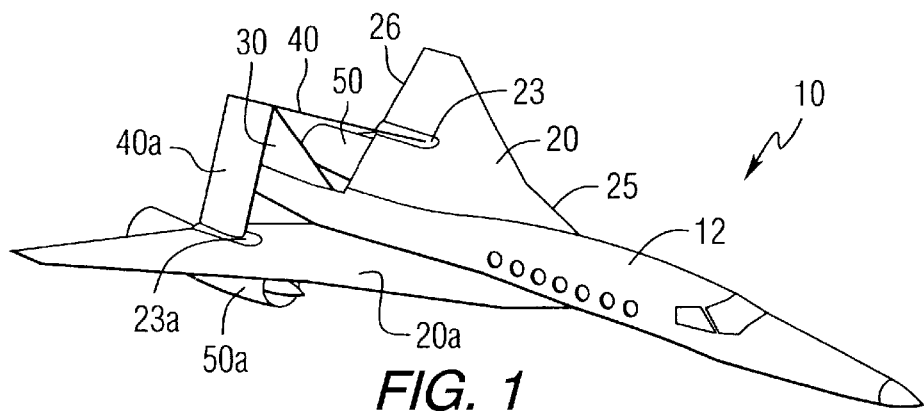
FIG. 1 is an isometric view of a supersonic aircraft in accordance with an embodiment of the present invention.

FIG. 1 illustrates a supersonic aircraft 10 in accordance with an embodiment of the present invention. The aircraft 10 includes a fuselage 12 having wings 20 and 20a connected thereto. A fin 30 is mounted on the upper surface of the fuselage 12 at a rear portion of the aircraft 10. A bracing tail 40, 40a is connected between the fin 30 and the wings 20, 20a. Engine nacelles 50 and 50a are mounted under the wings 20 and 20a. Generally U-shaped bulges 23 and 23a are provided on the upper surfaces of the wings 20 and 20a above the engines 50 and 50a, at the locations where the bracing tail 40, 40a connects to the wings 20 and 20a. The bulges 23 and 23a provide camber reflexes in the wings 20 and 20a.

Figure 2A:
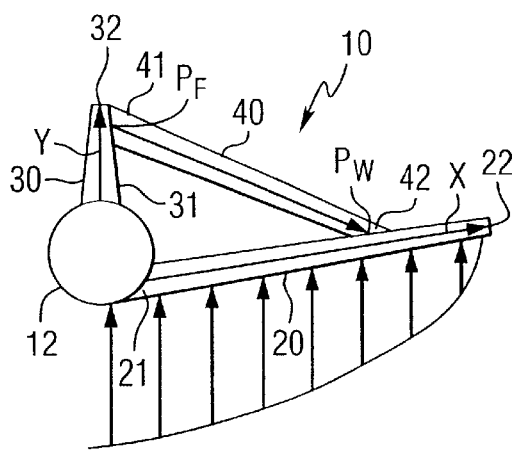
FIG. 2a is a partially schematic cross-sectional view of an aircraft including a tail-braced wing design in accordance with an embodiment of the present invention.
Figure 2B:
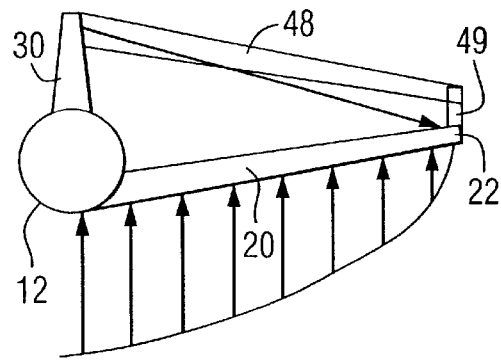
FIG. 2b is a partially schematic cross-sectional view of an aircraft including a box-wing design.

FIG. 2a is a partially schematic cross-sectional view of the aircraft 10. The wing 20 has a wing root 21 adjacent to the fuselage 12, and a wing tip 22 at the outboard end of the wing. As shown in FIG. 2a, the fin 30 has a fin root 31 adjacent to the fuselage 12, and a fin tip 32. The bracing tail 40 has a bracing tail root 41 mounted on the fin 30 at a connection point $P_F$. The bracing tail 40 also has a bracing tail tip 42 mounted on the wing 20 at a connection point $P_W$. FIG. 2b is a partially schematic cross-sectional view of an aircraft with a box-wing configuration. The upper wing 48 is connected to the lower wing 20 by a vertical winglet 49. As more fully described below, the box-wing design shown in FIG. 2b suffers from several disadvantages.

As illustrated in FIG. 2a, the distance from the wing root 21 to the wing tip 22 is labeled as the direction X. The distance from the fin root 31 to the fin tip 32 is labeled as the direction Y. The connection point $P_W$ between the wing 20 and the bracing tail 40 is selected in order to provide the desired structural support while also providing the desired supersonic flight characteristics. If the connection point $P_W$ is too close the fuselage 12, the outboard wing bending moment is not relieved sufficiently. Alternatively, the connection point $P_W$ is preferably inboard of the wing tip 22 because wing-tip connections increase the bending moment near the wing tip where structural depth is generally desired to be smallest. Furthermore, supersonic vortex drag is small so tip vortex suppressions provide much less benefit than subsonically. In accordance with an embodiment of the present invention, the connection point $P_W$ between the wing 20 and the tip of the bracing tail 40 is located at least 50 percent of the distance X from the wing root 21 to the wing tip 22. The connection point $P_W$ is preferably from about 50 to about 80 percent of the distance X. However, percentages as low as 20 percent may be used if $P_W$ is also the outboard engine location so that interconnecting structure can double as engine support structure.

As shown in FIG. 2a, the connection point $P_F$ between the fin 30 and the bracing tail 40 may be at least 20 percent of the distance Y from the fin root 31 to the fin tip 32. The connection point $P_F$ should be above the wing root to provide a truss effect for supporting the wings. Also, the rising bracing tail is better for sonic boom below the vehicle and generally reduces drag. The connection point $P_F$ is at least 20 percent of the distance Y, more preferably as high as possible without making the angle at $P_F$ so acute as to produce unwanted drag properties.

To increase the angle between the bracing tail 40 and wing 20 and make the bracing most effective, the vertical separation is maximized between the wing and bracing tail roots 21 and 41 by connecting the bracing tail 40 at or near the top of the fin 30, as in FIG. 1. Also shown, the long wing chord, low wing thickness and short chordwise separation between the wing 20 and bracing tail root 41 increases the benefit of bracing. The wing 20 is swept-back, placing it ahead of the bracing tail 40. This reduces the downwash of the bracing tail 40 on the wing 20 (downwash increases induced drag) subsonically and eliminates it completely supersonically. Having a swept-back wing leading edge 25, with at least a portion if not the whole, swept-back greater than the Mach cone angle reduces induced and pressure drag. The wing trailing edge 26 should be swept-back less than the Mach cone angle to keep the flow supersonic, which allows lift to be carried to the trailing edge, increases lift curve slope and reduces trailing edge separation. Such a wing avoids weight penalties when braced by a tail. Further, the high wing sweep allows the tail sweep to be reduced below the Mach cone angle, reducing the length of the bracing-tail. Low tail taper, especially at its mid-span to maintain stiffness, combined with short length helps the tail resist buckling under its primarily compressive wing-bracing load.

Figure 7:
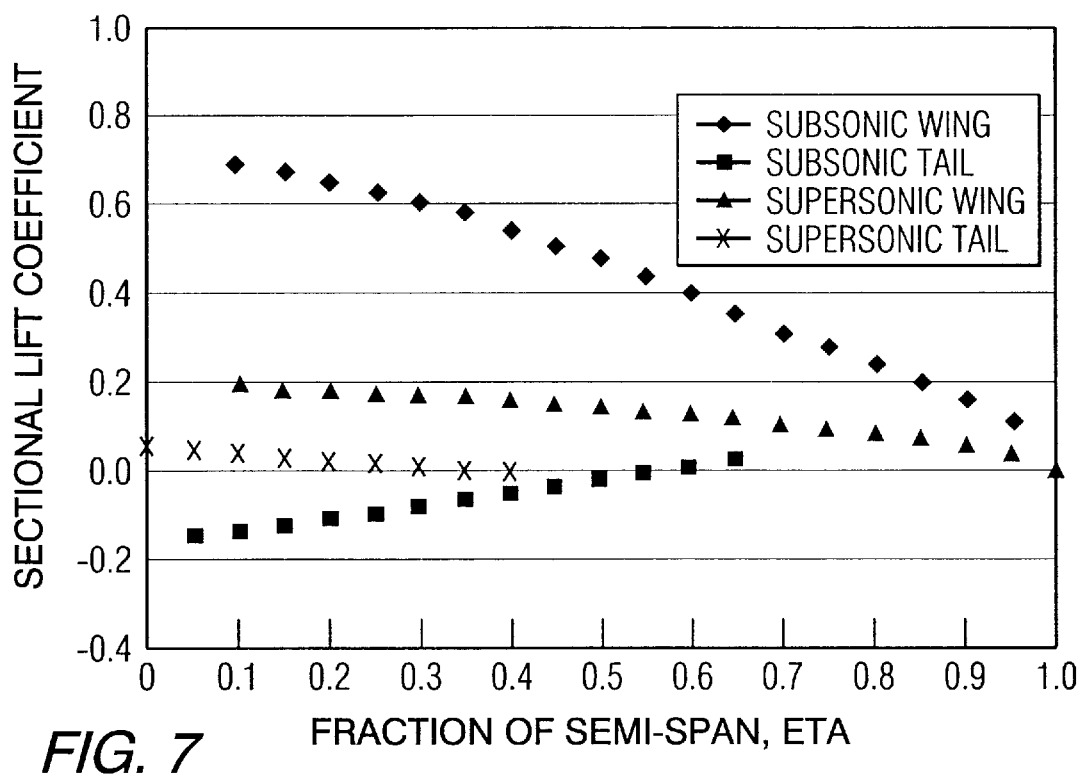
FIG. 7 is a graph including plots of sectional lift coefficient versus fraction of semi-span for subsonic and supersonic wing and tail designs.

In supersonic applications, long chords and thin structures lower induced drag and pressure drag, so low aspect ratio, multi-spar structures are preferably employed. The spars can be individually sized and spaced to take the best advantage of bracing. Another advantage of the supersonic application is that optimally loaded wing and tail combinations tend to have little pitching moment, so the tail is not needed for trim and can carry lift. Conversely, optimally loaded subsonic wings have large moments and require download on the tail to trim, as shown in FIG. 7. If the wing and tail are connected, the reduced separation increases the trim force required, resulting in a loss of performance for subsonic applications but no change for supersonic applications. Further, unlike box-wings, tandem wings and other joined-wings, the benefits of the present design are greatest when the bracing tail carries less than 25% of the lift. Thus, the terminology "tail-braced wing" is used instead of joined-wing.

This invention provides in-plane connecting structure, connection of the tail structure to the wing structure inboard of the wing tip and staggered in tandem connections.

Figure 3:
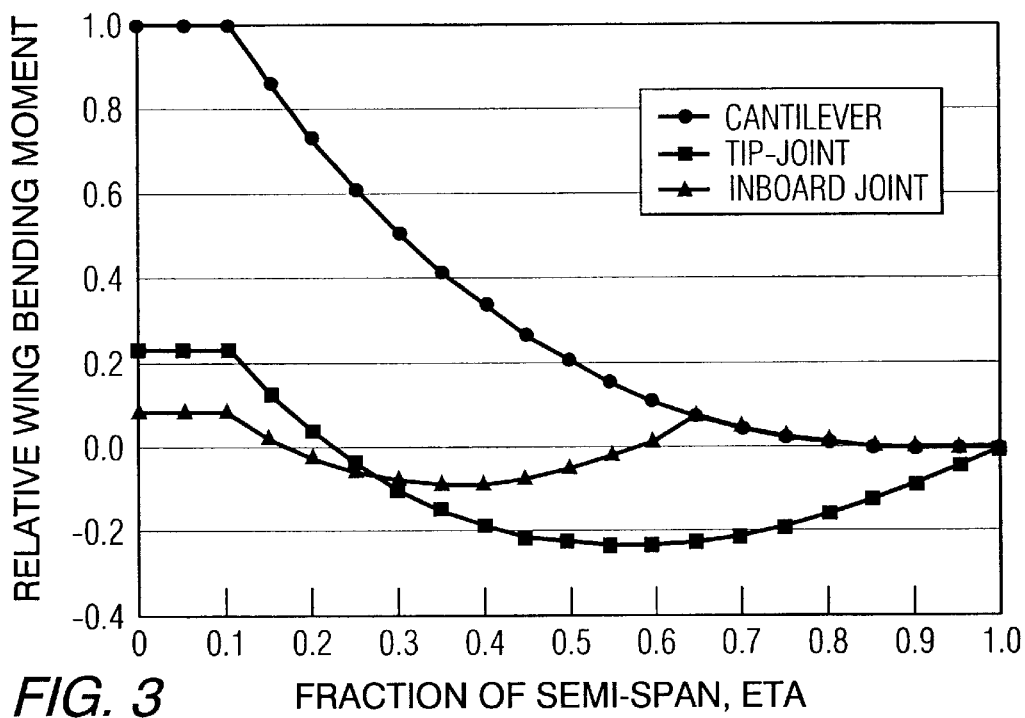
FIG. 3 is a graph including plots of relative wing bending moment versus fraction of semi-span for cantilever, tip-joint and inboard-joint designs.

In contrast, as shown in FIG. 2b, out-of-plane connecting members (e.g., box-wings) prevent the bracing-tail from reacting wing loads in the plane of the tail, greatly increasing joint stress and greatly reducing stiffness. The arrow from the fin to the wing tip in FIG. 2b shows how the wing load is not reacted in-plane. In accordance with the present invention, connecting the tail to the wing inboard of the wing tip causes the greatest reduction in wing bending moment, as shown in FIG. 3. Also, FIG. 3 illustrates that tip-joints, while reducing the high bending moment at the wing root, actually increase the bending moment between mid-span and the wing tip. Additionally, an inboard joint location further shortens the tail span, improving the tail's resistance to a buckling failure. An advantageous feature of this tail-braced wing is provided by the staggered in tandem joint connections.

Figure 4:
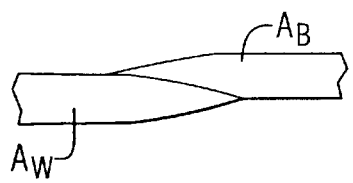
FIG. 4 schematically illustrates staggered in tandem wing and bracing tail cross-sectional areas in which a substantially constant area distribution is maintained.

FIG. 4 illustrates a staggered in tandem connection. In this view the cross-sectional area distribution from the wing through the tail is held nearly constant. The tail leading edge begins where the wing starts to decrease in depth. The decrease in wing depth is counteracted by the increasing tail depth, creating a favorable interference by improving the area rule. The area rule specifies that pressure drag is reduced when changes in cross-sectional area are minimized (i.e., by following a Sears-Haack bell curve shaped distribution) and the maximum cross-sectional area is minimized. The staggered connection reduces area changes and the maximum area and even results in drag reductions compared to non-connected structures. The improved area rule of staggered in tandem connections can be even more beneficial to transonic applications, where airfoils are thicker and shocks are more unstable and prone to cause separation. In contrast, most prior designs contemplated the use of superimposed connections with strongly unfavorable interference.

Figure 5:
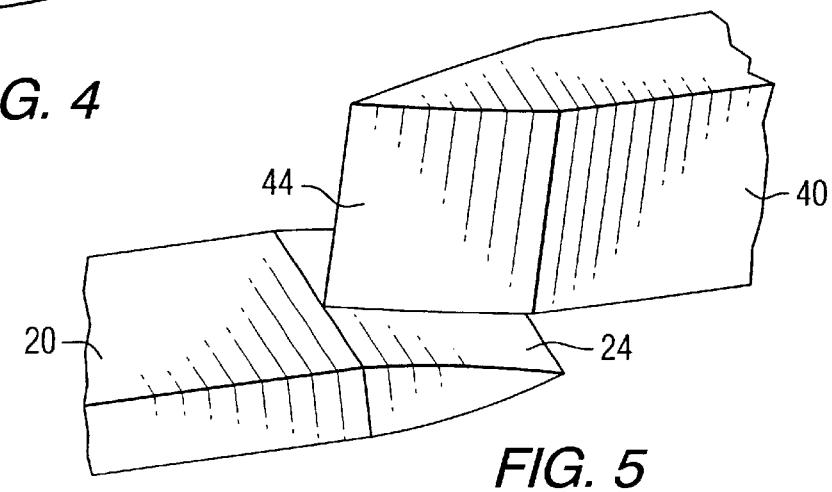
FIG. 5 is a partially schematic isometric view of a staggered in tandem connection region between a wing and bracing tail in accordance with an embodiment of the present invention.

The details of staggered in tandem structural connections are more geometrically complex. FIG. 5 shows the wing 20 structural box and tail 40 structural box being directly connected by structure filling the union of their overlapping tapered sections 24 and 44. As cross-section cuts show, by filling structure in the tapered region of both the wing and tail, the cross-sections include area in both the wing and tail planes giving the joint effectively more area. While there is a concentration of stress in this type of staggered connection, in this case, the aerodynamic benefits tend to outweigh the increased weight.

Figure 6:
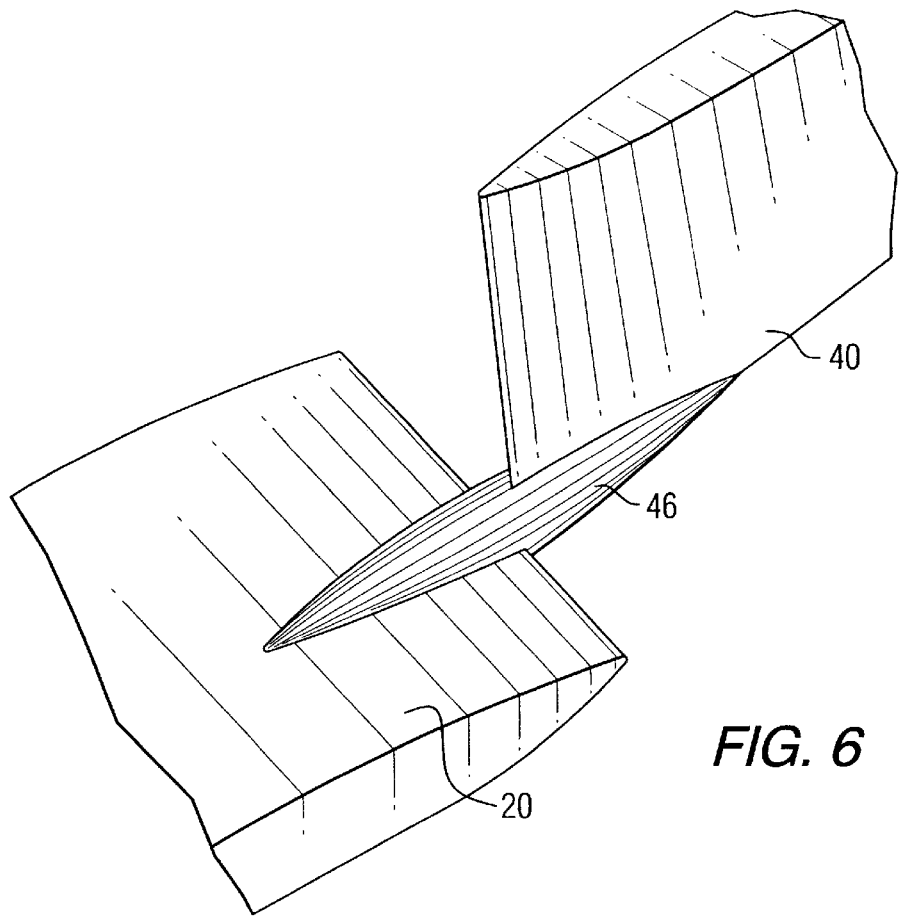
FIG. 6 is a partially schematic isometric view of a staggered in tandem connection region between a wing and bracing tail including a structural member in accordance with an embodiment of the present invention.

If more joint area is needed to reduce stress concentration, increase stiffness or increase connected structure separation, structure can be increased in the tapered region 24, 44 with an area ruled distribution, like the example in FIG. 6. In FIG. 6, a structural member 46 is provided at the connection between the wing 20 and bracing tail 40. Unlike prior interconnecting structure, the structural member 46 provides an area ruled distribution which fairs out as the maximum wing and tail depths are approached to keep from increasing the wing or tail maximum cross-sectional area.

Figure 37:
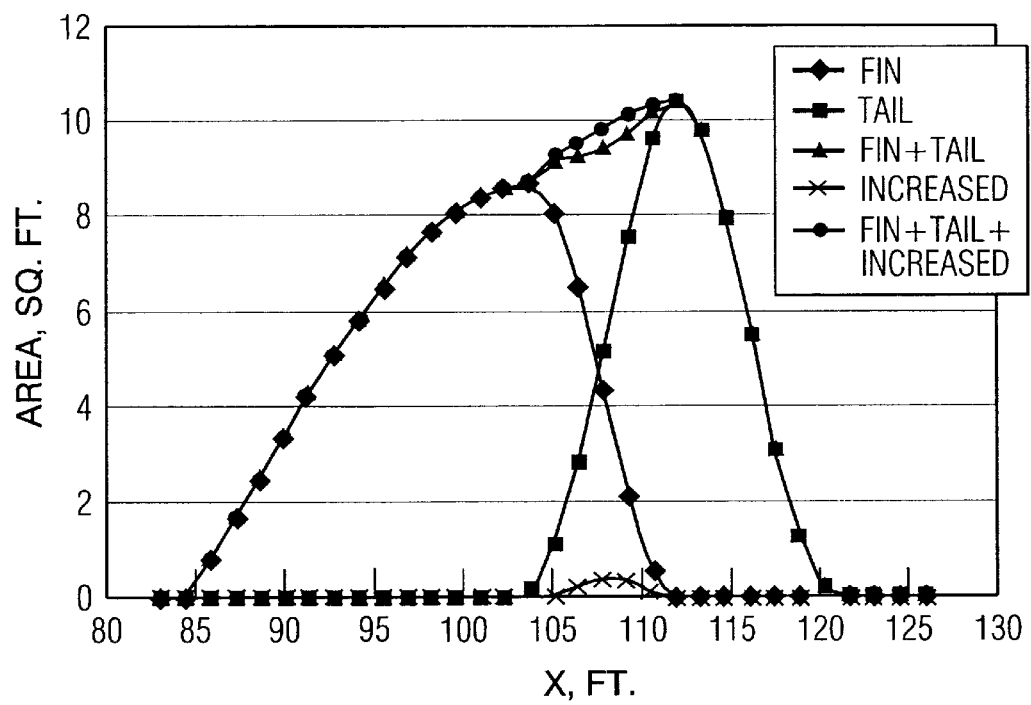
FIG. 37 is a graph showing area rule plots for a tail and fin staggered in tandem connection, including a structural member that increases the area to match a Sears-Haack distribution, in accordance with an embodiment of the present invention.
Figure 38:
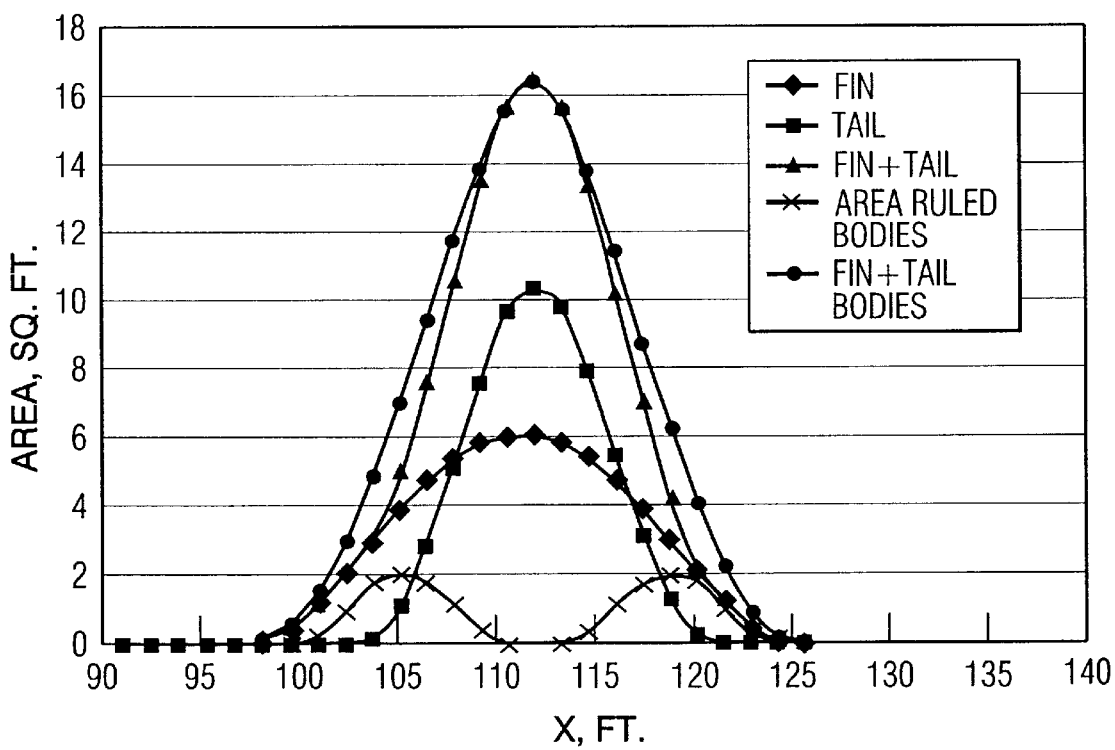
FIG. 38 is a graph showing area rule plots for a superimposed tail and fin with bodies extending off both the leading and trailing edges of the intersection that increase the area to match a Sears-Haack distribution, in accordance with an embodiment of the present invention.

FIG. 37 shows area rule plots for a staggered in tandem connection and a staggered in tandem connection with structure increased by a structural member, such as the member 46 as shown in FIG. 6. The tail and fin staggered in tandem connection provided by the structural member increases the area to match a Sears-Haack distribution, in accordance with an embodiment of the present invention. The increase is sized to improve the area ruling in the region of overlapping taper. If overlap is desired in the connection, tapered ends may be aligned with near constant mid-chord sections, like in FIG. 11, thereby avoiding superimposing two increasing tapers or two decreasing tapers. Such a configuration reduces drag, which increases with the square of the change in area. FIG. 38 is a graph showing area rule plots for a superimposed tail and fin with bodies extending off both the leading and trailing edges of the intersection that increase the area to match a Sears-Haack distribution, in accordance with an embodiment of the present invention.

Figure 8:
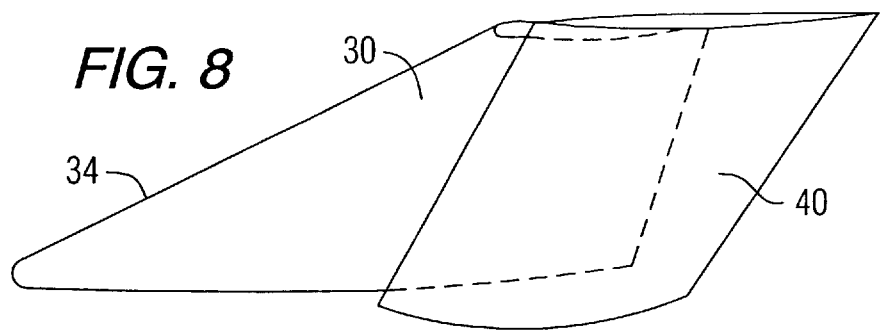
FIG. 8 is a partially schematic side view illustrating the connection between an aircraft fin and bracing tail in accordance with an embodiment of the present invention.

The bracing tail and fin connection should also be controlled. FIG. 8 shows a bracing tail 40 and fin 30 staggered in tandem connection with the fin 30 ahead of the bracing tail 40. To minimize the stagger, the fin 30 has a round, subsonic swept leading edge 34 that allows the maximum thickness to be achieved close to the leading edge. It also keeps all of the fin area growth in a Mach cone ahead of the bracing tail 40.

Figure 9:
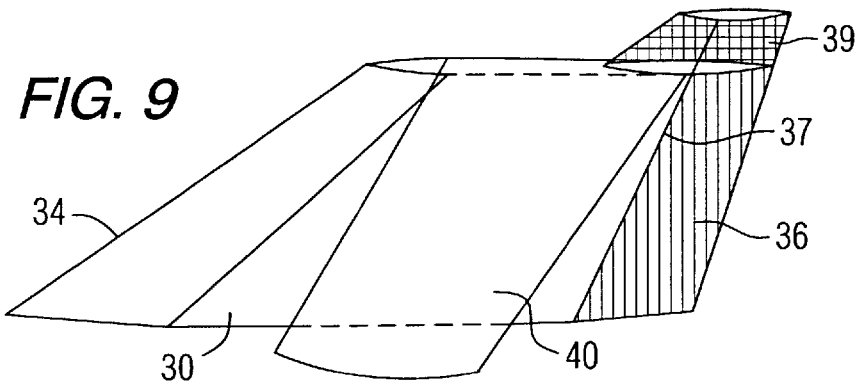
FIG. 9 is a partially schematic side view of the connection between an aircraft fin and a bracing tail in accordance with another embodiment of the present invention. A rudder extension option that increases control power and reduces hinge moments is also shown.

FIG. 9 shows a large, constant thickness section on the fin 30 where the bracing tail 40 connects. The fin leading edge 34 could be subsonic or supersonic. As shown in FIG. 9, the fin 30 may include a rudder 36. Since the fin 30 overhangs on the aft end, the rudder 36 effectiveness is good. The effectiveness can be further enhanced by extending the rudder 36 above the bracing tail 40 and forward, ahead of the hingeline 37, to a point of maximum bracing tail 40 thickness. The extended portion 39 of the rudder 36 is shown by the cross hatched area of FIG. 9. This improves area ruling and reduces deflected rudder hinge moments, reducing actuation requirements.

FIG. 10 shows a superimposed bracing tail 40 and fin 30 connection with area ruling bodies 38a and 38b extending ahead and behind the connection. The area ruling bodies 38a and 38b increase in area from their starting point until they are even with the bracing tail 40 and fin 30 edges. Thereafter, they decrease in area until they blend out at the maximum empennage thickness location. These bodies 38a and 38b have zero area in the middle and bulge to their maximum area coincident with the empennage leading and trailing edges. Also, the superimposed connection allows a long, full-thickness structural joint. These types of area ruling bodies 38a and 38b could also be added to a FIG. 9 type of connection (the rudder extension actually has same of this area ruling effect) to further reduce drag.

FIG. 12 illustrates a configuration of an aircraft 110 in accordance with an embodiment of the present invention. The aircraft 110 includes a wing 120, fin 130 and bracing tail 140. FIG. 12 shows that while the wing-bracing tail joint $P_W$ should be higher than the wing root 121, the wing 120 outboard of the joint $P_W$ can have a lower dihedral or even anhedral wing tip 122. The reduction in outboard dihedral reduces the tendency to roll while side-slipping, or allows a higher inboard dihedral at the same roll tendency. A lower wing tip 122 can also increase lift and reduce drag in ground effect. The outboard wing can also have a different sweep than the inboard wing.

A lower outboard sweep, like that schematically shown in FIG. 13, can reduce outboard structural weight and improve subsonic performance. FIG. 13 illustrates a joint between a wing 220 and bracing tail 240. The shaded areas of FIG. 13 represent the structural boxes of the wing 220 and bracing tail 240. The edges of the wing 220 outside the shaded structural box may be too thin to be used for structure, and may be taken up by flaps and control surfaces. Outboard, a small spanwise extent of leading edge sweep outside the Mach cone has only a small penalty on supersonic performance.

Another planform is shown in FIG. 14. The joint between the wing 320 and bracing tail 340 shows a structural option to interconnect the tip of the bracing tail 340 and the wing 320 rear spar by extending structure back from, and normal to, the rear spar until it covers the tip of the bracing tail 340. This creates a triangular interconnecting structure 342.

The shaded regions of FIG. 14 represent the structural boxes of the wing 320 and bracing tail 340.

A further planform option is shown in FIG. 15. The joint between the wing 420 and bracing tail 440 shows that the wing chord can be increased outboard. This can take the form of a blending between the wing 420 and bracing tail 440 outboard of the connection with structural benefits and lower sectional CLs where stresses are often greatest. The shaded regions of FIG. 15 represent the structural boxes of the wing 420 and bracing tail 440.

Research, like that taught by Baals, Robins and Harris, concluded that the most efficient propulsion arrangement consists of podded nacelles located under the wing and behind the line of wing maximum thickness. This arrangement is aerodynamically efficient because it counteracts the two largest sources of abrupt area changes—the rapid area closure of the wing and the rapid area growth of the nacelles—and uses the nacelle area growth compressions to increase wing lift. Unfortunately, later SST and HSCT studies found that the weight penalties needed to overcome wing-nacelle flutter and aeroelastic problems, caused by having the nacelles cantilevered off the rear of the wing, cancelled the aerodynamic efficiency of this propulsion arrangement. To overcome flutter and aeroelastic flexure, greater wing stiffness, including torsional stiffness is needed. A significant structural effect of tail bracing is the stiffness increase, especially in torsion. A tail-braced wing allows the efficiency of nacelles mounted behind the line of wing maximum thickness to be achieved.

When combining cantilevered nacelles and tail bracing, several other integration synergies may be achieved. If the wing-tail connection is made at the same spanwise location as the nacelle, the tail can provide additional nacelle support. The cantilevered nacelle can be attached to the tail-tip. The nacelle weight relieves compressive load in the tail. The wing-tail connection and nacelle support can use common structure with greater thickness, resulting in lower weight.

FIGS. 16a–16c illustrate such an arrangement with the wing 20 and bracing tail 40 spars blending with the nacelle 50 structure. FIG. 16b also illustrates the swept forward design of the bracing tail 50 at an angle less than the Mach cone.

Another integration option would be for the wing-bracing tail connection to be outboard of the nacelle location. To reduce engine-out control requirements, the engines are mounted as close to the center as the landing gear allows. But, as shown in FIG. 3, the wing is most in need of bracing further outboard, where the wing is thinner. With the wing-bracing tail connection outboard of the nacelle, wing stiffness is still greatly increased, wing bending moment is reduced and only the common structure benefit is lost.

Similarly, for an aircraft 510 with a four engine arrangement 550a, 550b, 550c and 550d as shown in FIG. 17, a wing-bracing tail connection $P_W$ at the outboard nacelle location 550a would increase stiffness for both nacelles 550a and 550b and support for the more critical outboard nacelle 550a (cantilevered off thinner structure), near optimally reduce wing bending moment and allow for common joint-nacelle structure.

Figure 18A:
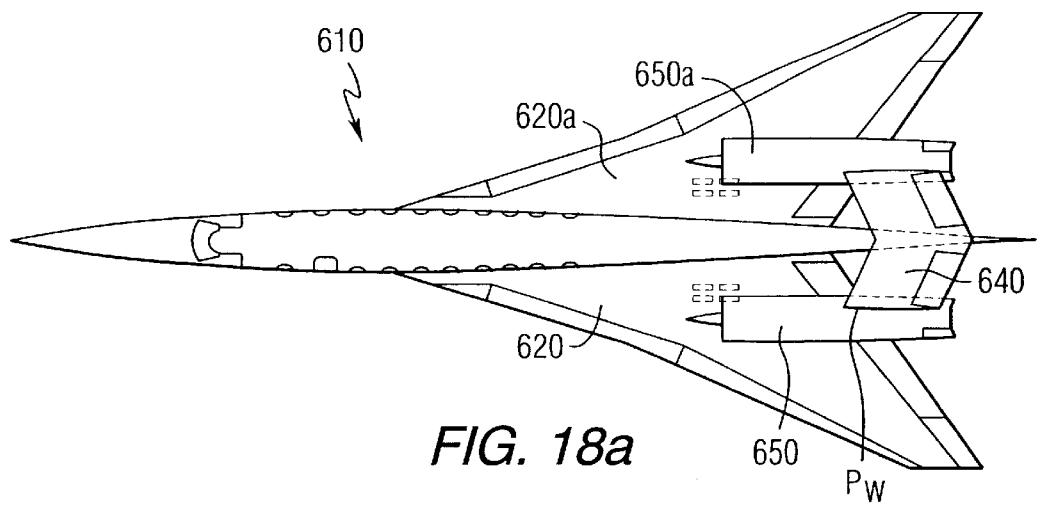
FIG. 18a is a top view of a supersonic aircraft in accordance with a further embodiment of the present invention.
Figure 18B:
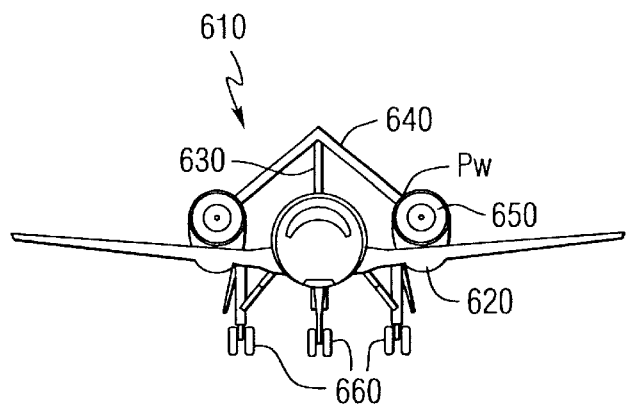
Figure 18C:
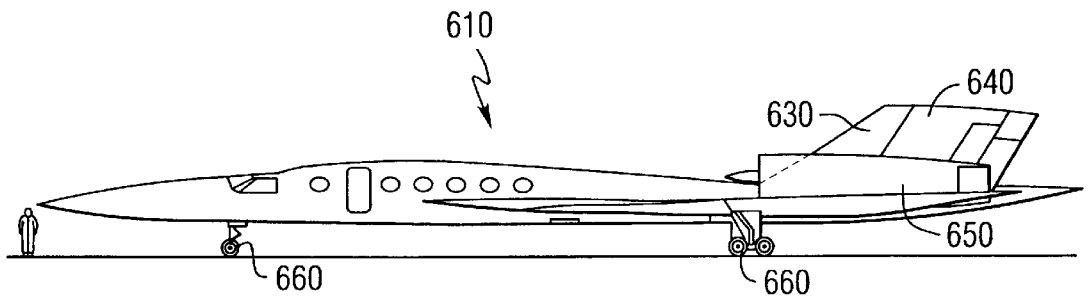

One disadvantage to the under wing mounted nacelles, seen in FIG. 16a, is the long landing gear 60 required. Mounting the nacelles 650 and 650a on top of the wing 620 and 620a allows much shorter, lighter landing gear, as shown in the aircraft 610 illustrated in FIGS. 18a–18c. The wing-bracing tail connection $P_W$ can be through the nacelle 650 itself. However, the connection could also be directly to the wing, as shown previously. The nacelle 650, as shown in FIG. 18, maintains area ruling between the wing 620 and bracing tail 640. However, flow quality into the inlet of the nacelle 650 must be examined at higher angles-of-attack to insure that engine requirements are met.

Figure 21:
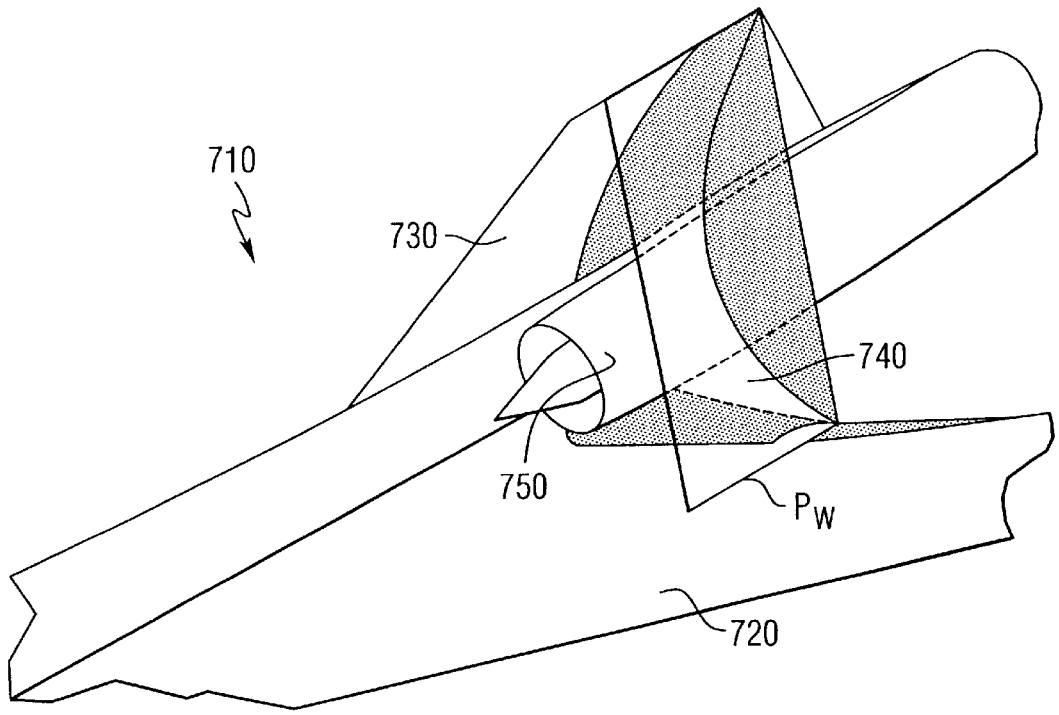
FIG. 21 is a partially schematic isometric view of a portion of an aircraft illustrating an engine mounted above the wing inboard of the connection between the wing and a bracing tail with favorable compression impingements in accordance with an embodiment of the present invention.

On the other hand, the engine could be mounted inboard of the wing-bracing tail connection $P_W$, as shown by the aircraft 710 illustrated in FIG. 21. This could either be an inboard wing or aft fuselage mounted nacelle. The engine could also be buried in the aft fuselage, with the inlet forming the same type of pressure disturbance and using the same following integration techniques. The shaded regions in FIG. 21 show the locations of nacelle pressure disturbance impingement. The nacelle 750 has been positioned so that the impingement occurs aft of the wing 720, fin 730 and bracing tail 740 maximum thickness locations. The drag from the nacelle 750 forebody (inlet) is completely captured and turned back into thrust on the wing 720, fin 730 and bracing tail 740.

While the previous section described aerodynamic and weight saving designs that result in range improvements due to the integration of tail-braced wings and nacelles, this section will disclose nacelle installation configurations not dependent on tail-braced wings that increase supercruise range. The aforementioned technique of recovering the nacelle pressure drag as thrust on the wing, bracing tail and fin, also works with T-tails and without the tail. Further, the following improvements to prior art wing reflexing, allow maximum benefits to be achieved on lifting, control and other surfaces.

To begin with, nacelle pressure disturbances are not well approximated by axisymmetric flow solutions. This is because all production inlets are connected to their aircraft by diverters or pylons and are often not circular, especially for engines buried within the aircraft structure. Adding a diverter or pylon in the channel between an aircraft and an inlet greatly alters the impinging pressures, typically doubling pressures in the channel between the aircraft and inlet/nacelle and completely canceling pressures elsewhere. By using the actual inlet/nacelle, aircraft and interconnecting geometry, the actual nacelle impingement pressure on the aircraft can be calculated. The optimal aircraft camber slope change can then be determined.

A solution for such geometry can be calculated using any method with at least second-order accuracy, like full-potential and Euler CFD methods that can represent the actual shapes. The effect of a viscous boundary layer on impingement pressure, while generally smaller in magnitude, also improves the impingement pressure calculation and is preferably used for final geometry definitions. For lifting surfaces, the surface loading is re-optimized for minimum drag in the presence of the impinging pressures, resulting in a slight (generally 6%) increase in loading where compressions increase the local lifting efficiency (due to the higher lift curve slope in the locally lower Mach number). Minimum drag is achieved with 100 percent impingement induced load cancellation. The resulting reflexed camber slopes have much larger slope changes near the nacelle/diverter and barely discernible slope changes away from the nacelle, in contrast with prior art designs.

Figure 19A:
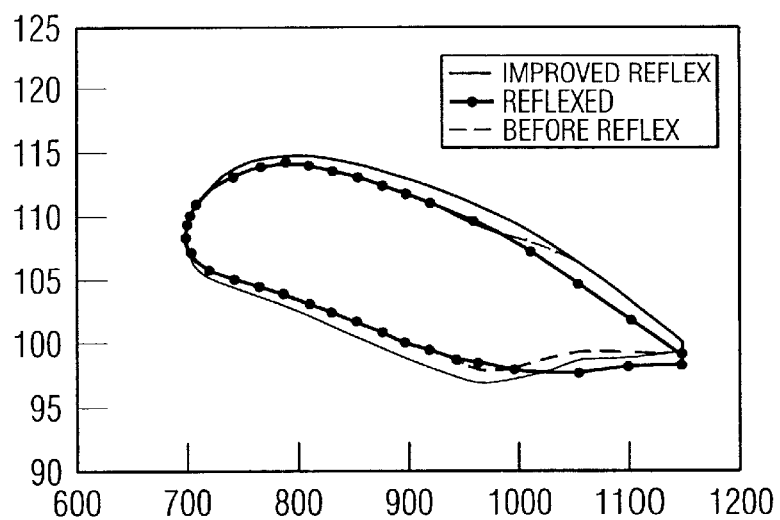
FIGS. 19a–19e illustrate cross-sectional wing shapes and corresponding sonic boom characteristics for a reflexed and an improved reflex wing of the present invention in comparison with a design before reflex.

FIG. 19a illustrates exaggerated cross sectional wing shapes for an improved reflex design in accordance with an embodiment of the present invention, in comparison with a non-reflexed design and a different reflexed design. FIGS. 19c–19e illustrate sonic boom profiles for the non-reflexed, reflexed and improved reflex designs, respectively.

Figure 19B:
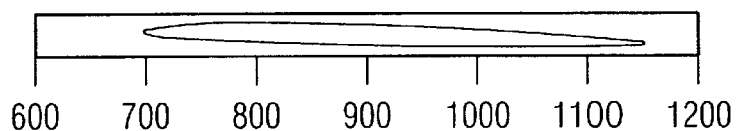
Figure 19C:
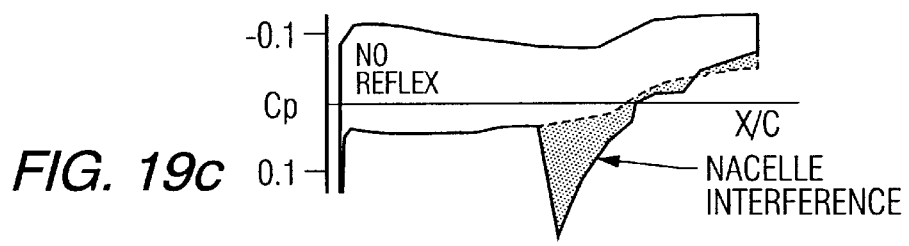
Figure 19D:
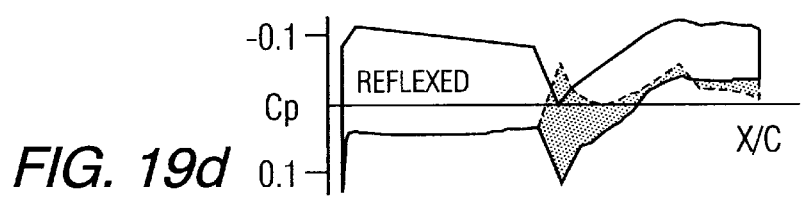
Figure 19E:
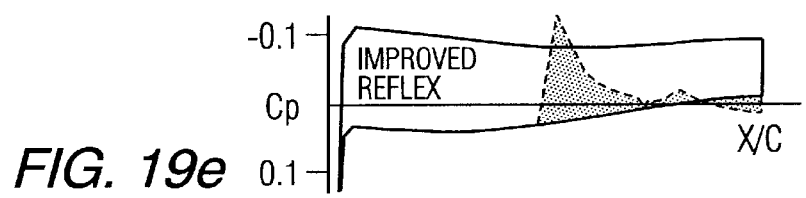

The improved reflex cross sectional wing shape shown in FIGS. 19a and 19b includes a reflexed airfoil and pressure distribution near the nacelle/diverter. The airfoil cross section is shown in FIG. 19a with an exaggerated thickness scale so the improved reflex shape can be more easily seen. The non-exaggerated thickness shown in FIG. 19b shows that the slope change is actually small. The reflexed pressure distribution shows how the minimum drag load, prior to the nacelle interference, has been achieved in the presence of the nacelle-induced pressure. This kind of reflex usually creates a bump and corresponding compression on the upper airfoil surface while it weakens the impinging compression on the lower surface. Ideally, this disturbance on the opposite surface should be avoided.

To avoid disturbances on the opposite surface when reflexing, the surface thickness is modified along with the camber slope change. The term "thickness slope" is defined herein as the rate of change in the half-thickness of the airfoil versus chord. Once the camber slope change needed to cancel the impinging pressure load is determined, a thickness slope change of the same magnitude is also applied to the surface. Camber slope changes alter the impinged surface and opposite surface with the same slope change. On the other hand, thickness slope changes alter the opposite surface slope by the same absolute magnitude but with the opposite sign. Making the thickness slope change the same as the camber slope change doubles the reflex on the impinged surface and cancels out completely on the opposite surface, restoring the original opposite surface shape.

However, when the thickness is reflexed, the trailing edge closure is compromised. To counter this problem, the thickness slopes ahead of the reflex must be scaled-up by a common factor such that the original trailing edge closure is restored. Since the thickness reflex and scale-up do not alter the camber, the optimum loading for minimum drag can be maintained, as described previously, for the camber-only reflex. The thickness reflex and scale-up also keeps the structural thickness from being compromised where it is critical for supporting the propulsion system weight. In addition, the cancellation of the impinging pressures helps to achieve the sonic boom reduction concepts described later.

Further, as shown in FIG. 19e, the addition of the thickness reflex causes the entire inlet/nacelle impinging pressure to be cancelled, instead of just half-cancellation with the camber-only reflex.

Except for the changes described, the reflex may otherwise be calculated using standard aerodynamic design methods. This combined camber and thickness reflex can be calculated from the difference between the pressures with the inlet/nacelle and without. The camber slope reflex is the shape calculated to cancel the difference between the solutions. Any method, such as inverse singularity or iterative CFD, can be used to find the change in camber slope that cancels the load. The addition of a thickness reflex equal to the camber reflex has the effect of only modifying the impinged surface (except for scale-up effects) and can also be calculated by only modifying the impinged surface instead of the camber slopes. The loading for minimum drag should be calculated in the presence of both the impinging pressure and the thickness reflex to account for the aforementioned optimum load changes due to the local Mach number. The reflex shape can also be arrived at through iterative CFD shaping for minimum drag. However, because drag gradients are harder to resolve than normal force, the calculation takes much longer and does not resolve the reflex shape as accurately as directly designing out the impinging pressure.

Calculating the flow-field around an inlet/nacelle and any impinged surfaces can be complex. This is especially true if multiple inlet/nacelle locations are to be compared. An efficient alternative to calculating the difference between the pressures with the inlet/nacelle and without is by approximating the impinged surfaces with a no-flow, streamwise boundary condition. The no-flow boundary could be a streamwise cylinder to mimic a fuselage as an impingement surface.

Figure 20:
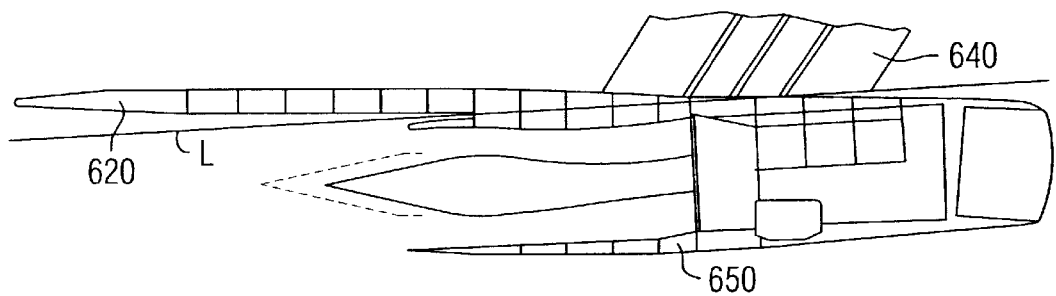
FIG. 20 is a side sectional view of a portion of an aircraft illustrating a nacelle mounted under an improved reflex wing in accordance with an embodiment of the present invention.

FIG. 20 shows how a nacelle-wing intersection can be approximated by a planer no-flow boundary condition that mimics the wing lower surface impingement. The actual, non-axisymmetric nacelle and diverter geometry are used with the planer boundary approximating the average slope of the wing lower surface, illustrated by the line L in FIG. 20. The freestream flow is specified as parallel to the planer boundary condition, so that the intersection is modeled most accurately, at the expense of accuracy elsewhere, where the pressure disturbance will be weaker. Since the boundary condition is defined parallel to the freestream, the pressures on the boundary represent the difference between with the inlet/nacelle and without. Superimposing these pressures at desired locations, on simpler solutions without the inlet/nacelle, allows rapid inlet/nacelle placement studies from this single boundary solution. The reflex can also be refined later from an exact, full-configuration solution, resulting in small additional improvements. Alternately, these improvements to reflexing technology can also be used to reduce drag in the presence of other strong pressure disturbances such as canopies, stores, joined structures, etc.

Figure 22A:
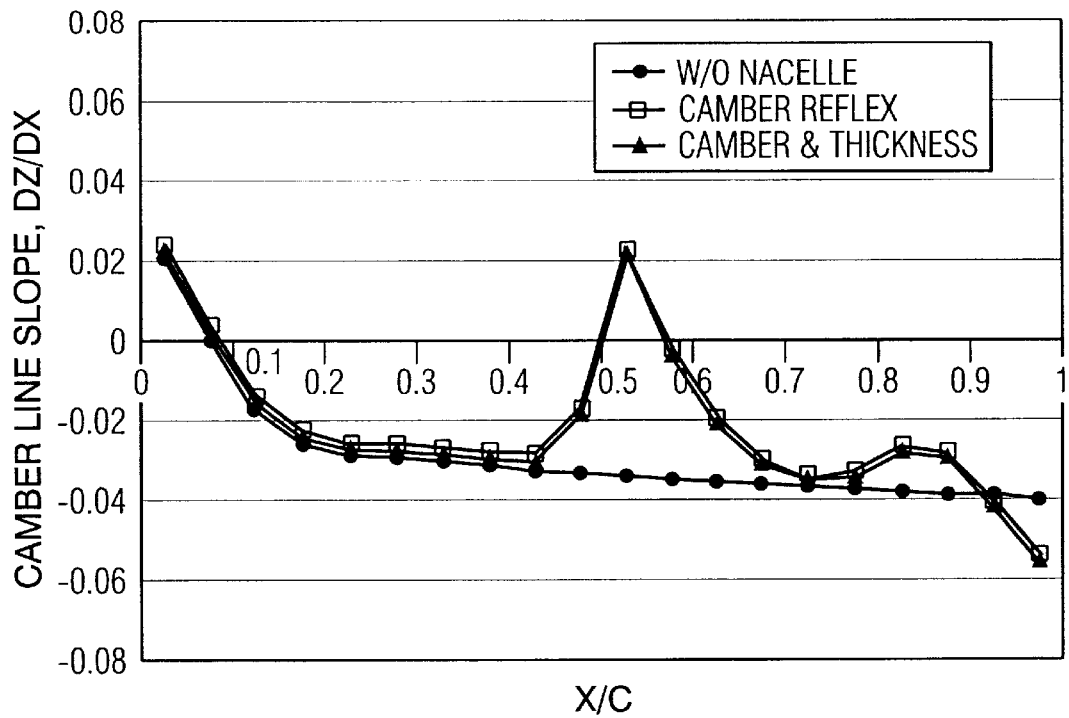
FIG. 22a is a graph including plots of camber line slope versus X/C for before reflex, reflexed and improved reflex wings.
Figure 22B:
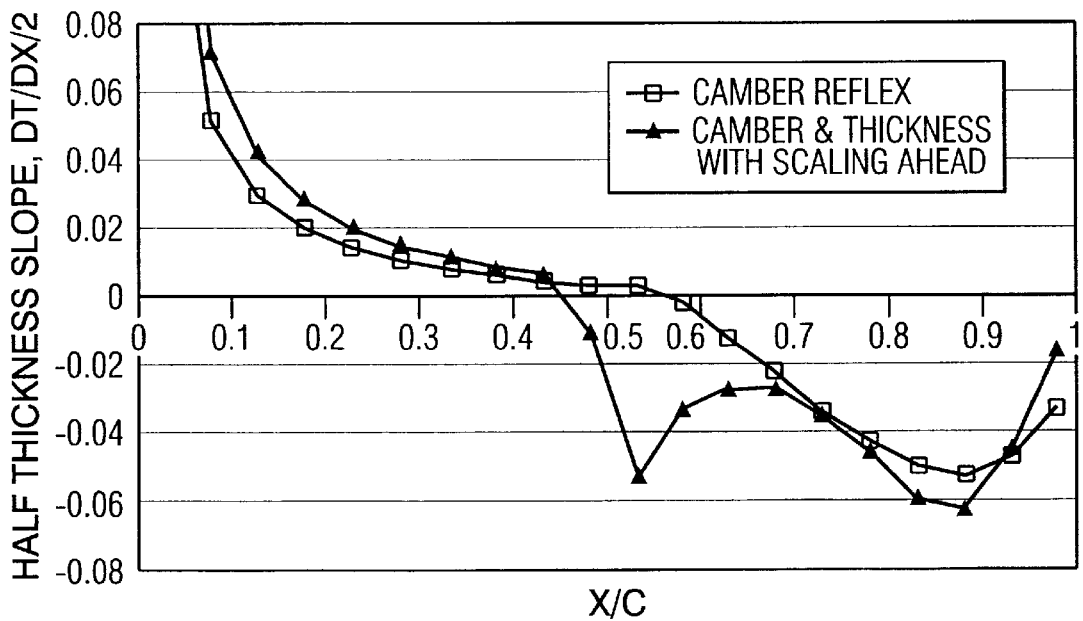
FIG. 22b is a graph including plots of half thickness slope versus X/C for before reflex, reflexed and improved reflex wings.
Figure 22C:
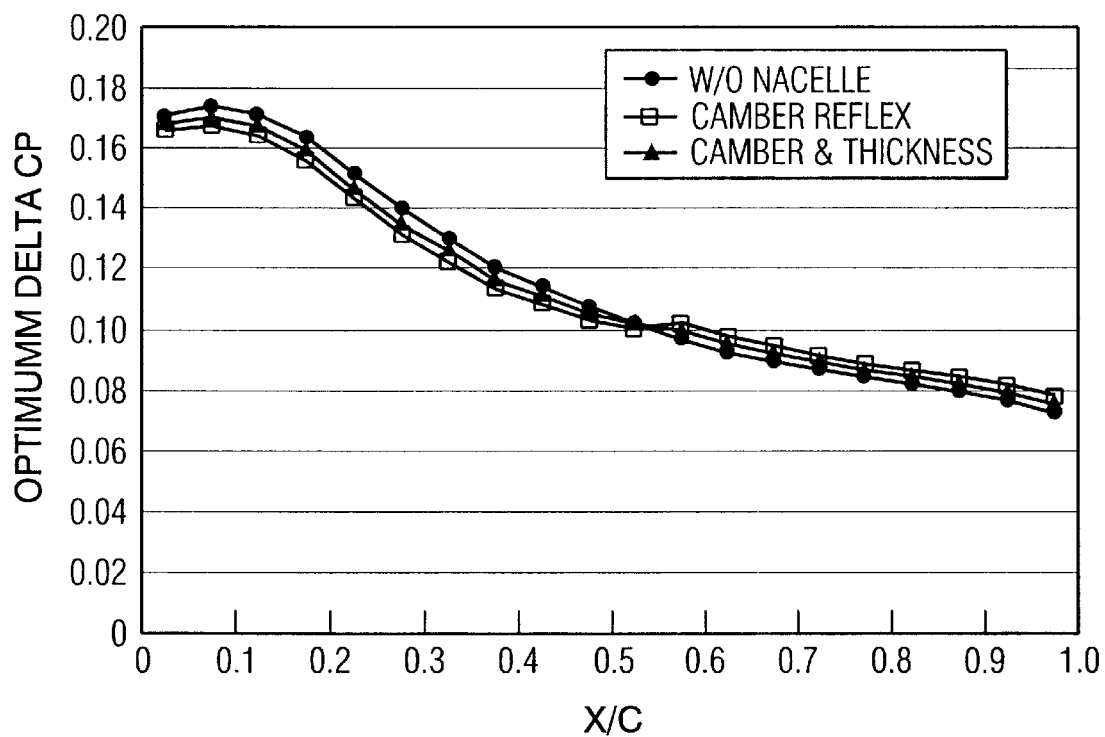
FIG. 22c is a graph including plots of optimum wing lower surface minus upper surface differential pressure versus X/C for before reflex, reflexed and improved reflex wings.

FIGS. 22a, 22b and 22c illustrate the camber and thickness changes from FIG. 19. FIG. 22a shows the camber line slope change needed to cancel one-half of the propulsion induced pressure disturbance. FIG. 22b shows the how the improved reflex has a corresponding half-thickness slope change. The small difference in camber slope for the improved reflex is the result of a second-order optimization that slightly changes the optimum loading (in the presence of impinging pressures due to volume, propulsion nacelle and wing thickness in this case.)

Figure 23:
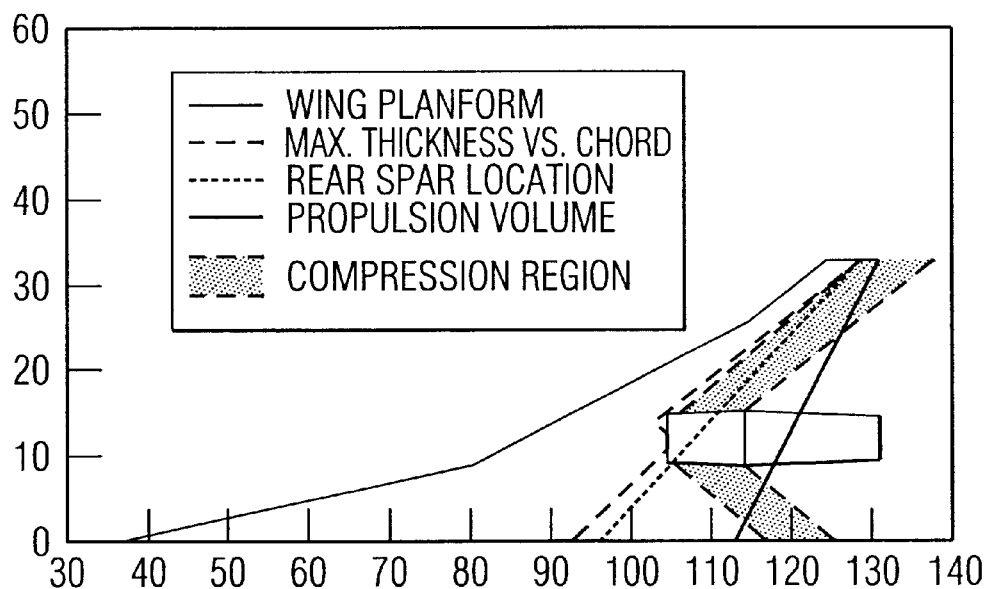
FIG. 23 is a top view of a swept-back wing, showing maximum thickness versus chord and rear spar location in accordance with an embodiment of the present invention.
Figure 24:
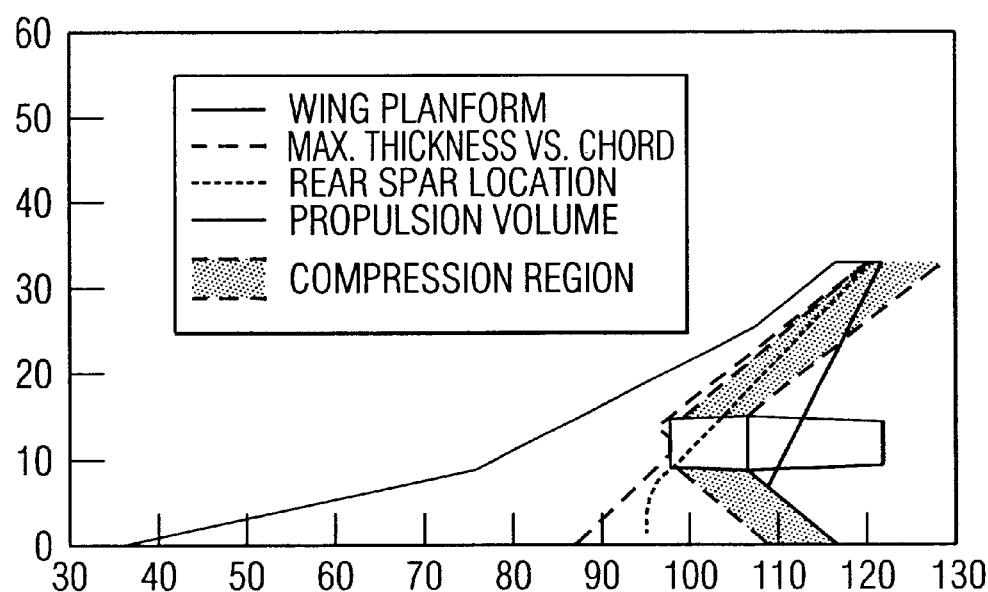
FIG. 24 is a top view of a swept-back wing, showing Maximum thickness versus chord and rear spar location in accordance with an embodiment of the present invention.

FIGS. 23 and 24 show how a planform can be shaped to achieve the greatest beneficial interference from a compression disturbance source mounted on the aft chordwise portion of a surface, like a wing. The wing thickness reflex procedure previously described allows the rear spar depth to be maintained by increasing depth ahead of the compression region (instead of reducing depth in the compression region). FIG. 23 shows how a typical planform can be defined such that the maximum thickness is kept ahead of the nacelle compression region. Notice that almost the entire region behind the wing maximum thickness is impacted by the compression region or is covered by the propulsion system, even though the trailing edge sweep is far less than the compression shock angle. This coverage by the propulsion system and compression region impingement substantially reduces the largest source of wing wave drag. The lower trailing edge sweep allows the compression on both sides of the nacelle to be exploited with a lower rear spar length and sweep, thereby lowering weight. FIG. 24 adds a high negative trailing edge sweep near the wing root that follows the compression region back, allowing even more of the region to be exploited.

Further, the aft extension of the root chord allows the inboard rear spar to be unswept, reducing rear spar length, sweep and weight. Higher trailing edge sweep could also be used to follow the outboard shock angle exactly if a bracing-tail was used to help support the wing because of the resulting long, highly swept rear spar.

Friction drag is generally around 40% of the total drag, so it is desirable to reduce this drag source as well. Laminar flow boundary layers create the largest known friction drag reductions. At supersonic speeds, significant laminar flow can be achieved under the proper conditions. Surfaces should be very smooth and free from the discontinuities of typical leading edge flap devices. Typical supersonic airfoils, like biconvex and similar shapes with always decreasing thickness slopes, develop strong favorable pressure gradients (going from higher pressure to lower pressure) that are conducive to laminar flow. Additionally, swept surfaces and shock impingements cause cross-flow instabilities that spoil laminar flow, so low sweep surfaces in regions without shock impingements are conducive to laminar flow. The bracing tail and supersonic swept fin arrangements described herein meet all of these criteria. Leading edge devices are not required on the bracing tail because the wing downwash limits the angle-of-attack of the bracing tail. Additionally, the outboard most portion of the wing, e.g., from FIG. 13, could forego a leading edge device and achieve laminar flow. In this way, limited laminar flow can be achieved in combination with the aforementioned wave and induced drag reductions. Since laminar flow becomes more difficult to maintain the longer a surface becomes, the shorter lengths of the bracing tail, fin, outboard wing (and nose as described later) can be made to have stronger and more robust favorable pressure gradients. The greater the thickness-to-chord ratio, the more robust the favorable gradient will be. Shorter lengths of laminar flow can be more practically and reliably achieved.

The present invention provides reduced sonic boom loudness while maintaining long supersonic range. Minimizing sonic boom loudness requires shaping sonic boom for low shock strengths. FIG. 25a illustrates how the pressure distribution from a conventional supersonic aircraft coalesces into an N-wave at the ground—the shape with the greatest shock strength. The Seebass, George, Darden minimization theory requires that the pressure disturbance caused by a low boom aircraft follow an inversely calculated distribution to result in the lowest shock strength at the ground. In contrast with intuition, the low boom distribution requires a strong leading edge compression that quickly reduces in magnitude, followed by a gradually increasing weak compression that rapidly inverts into a weak expansion, followed by a stronger trailing edge expansion that gradually recompresses to ambient. The key to minimization is creating an aircraft that produces that inversely calculated pressure distribution without sacrificing performance. The pressure disturbance of the aircraft is caused by both its Mach angle, cross-sectional area distribution, FIG. 25b, and its Mach angle lift distribution, FIG. 25c. To achieve a minimized pressure distribution, the sum of the area pressure disturbance and the lift pressure disturbance must equal the minimized pressure distribution.

In accordance with the present invention, to facilitate the application of the Seebass, George, Darden minimization theory, an equivalent area technique is provided.

Equivalent area is the Mach angle area distribution of an axisymmetric body that generates the same disturbance as a given geometric area or given lift distribution. The equivalent area due to geometric area can be approximated as equal to the Mach angle area distribution. The equivalent area due to lift is equal to the integral of the Mach angle lift per unit of streamwise length times some atmospheric constants.

Figure 26:
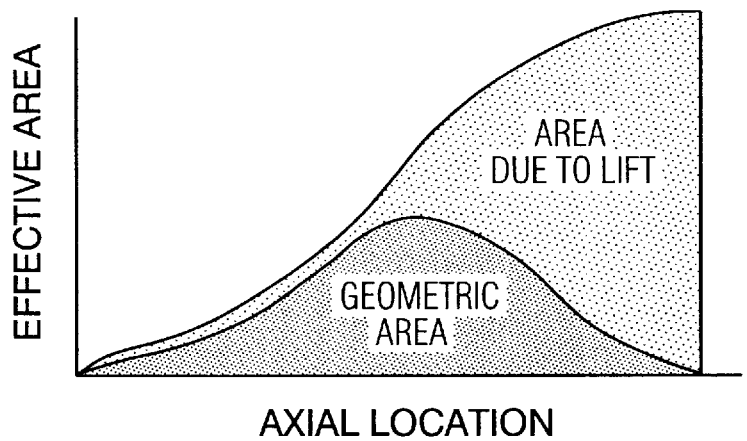
FIG. 26 is a graph of effective area versus axial location illustrating magnitudes of geometric area and area due to lift.
Figure 27:
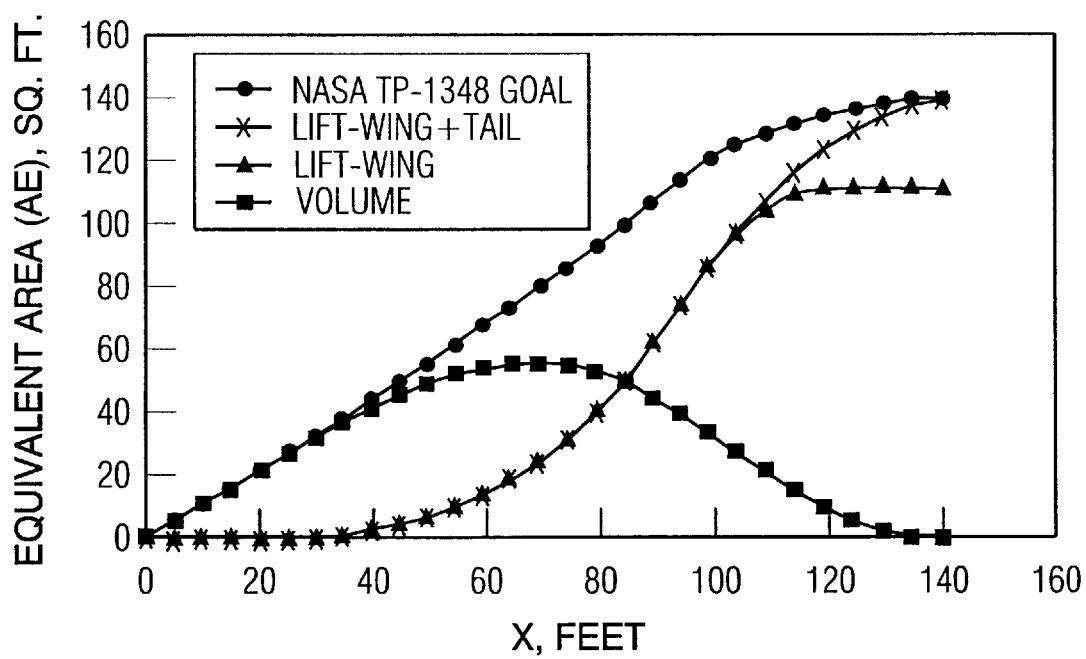
FIG. 27 is a graph including plots of sonic boom minimized equivalent area versus distance in accordance with an embodiment of the present invention.
Figure 36A:
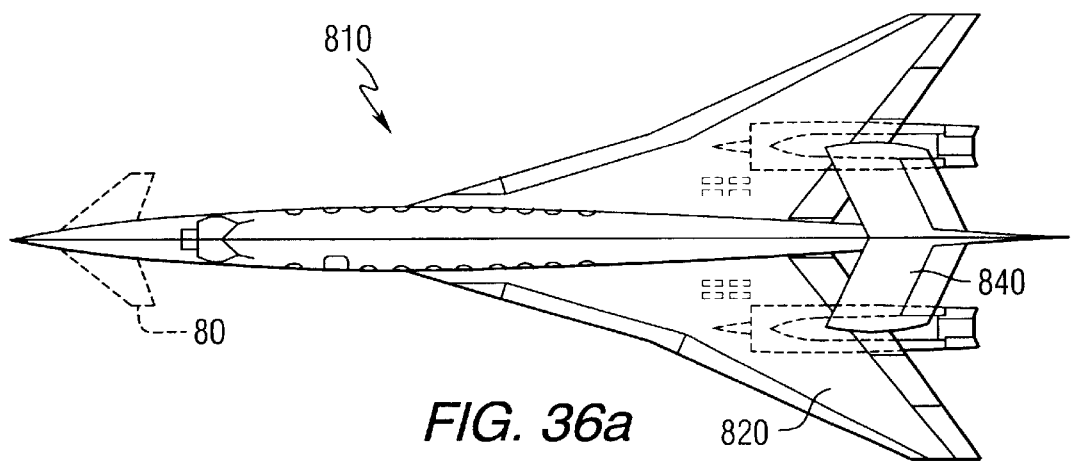
FIG. 36a is a top view of a supersonic aircraft in accordance with an embodiment of the present invention.
Figure 36B:
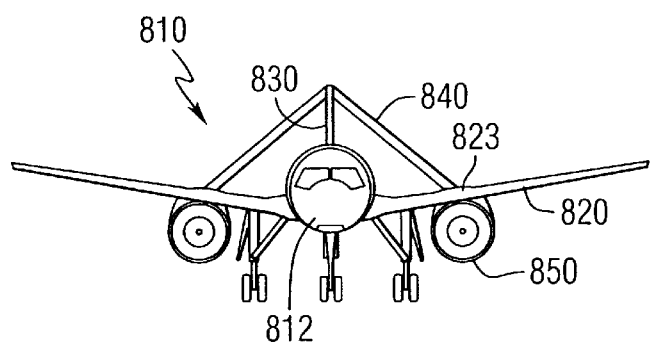
Figure 36C:
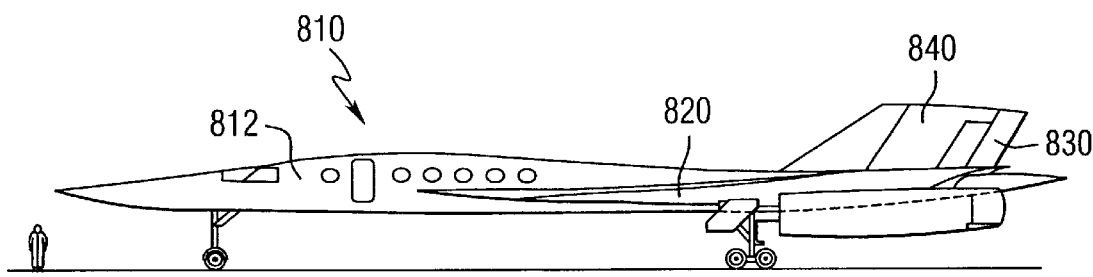

As shown in FIG. 26, when the equivalent area due to geometric area and lift sum to the minimized distribution as calculated from Darden, a minimized ground sonic boom is expected. FIG. 27 shows how the lift due to the wing and bracing tail along with the area due to volume can add up to the equivalent area goal from Darden. The tail-braced wing can achieve this minimized sonic boom concurrent with a drag minimized lift distribution and volume close to a minimum wave drag Sears-Haack body. A design with this volume and lift distribution is shown in FIGS. 36a–36c.

The nose is a critical region for sonic boom minimization. Contrary to intuition, minimization wants a relatively strong nose shock, which can lead to higher drag. Darden introduced a Mach angle length (YF) over which the nose bluntness can be relaxed to reduce the drag from the strong nose shock. The formulation assumed a continuous, linearly increasing F-function for the first half of the nose bluntness relaxation length (YF/2), followed by a linearly decreasing F-function for the second half, shown in FIG. 28a as Prior Art. This prior art relaxed nose bluntness shape is very sharp with a complex inflecting curvature (FIG. 28c) and an initial strong adverse pressure gradient (FIG. 28b).

Since the idea behind bluntness relaxation was drag reduction, a minimum drag distribution (such as Sears-Haack) should be integrated with minimization. To accomplish this, a minimum wave drag area distribution in the bluntness region (<YF) should be followed by constraints to the equivalent area distribution needed to achieve the same F-function as the prior art. In practice, the equivalent area distribution of the prior art can be used as constraints outside the bluntness region and will yield a slightly better F-function (lower pressure.)

Figure 28A:
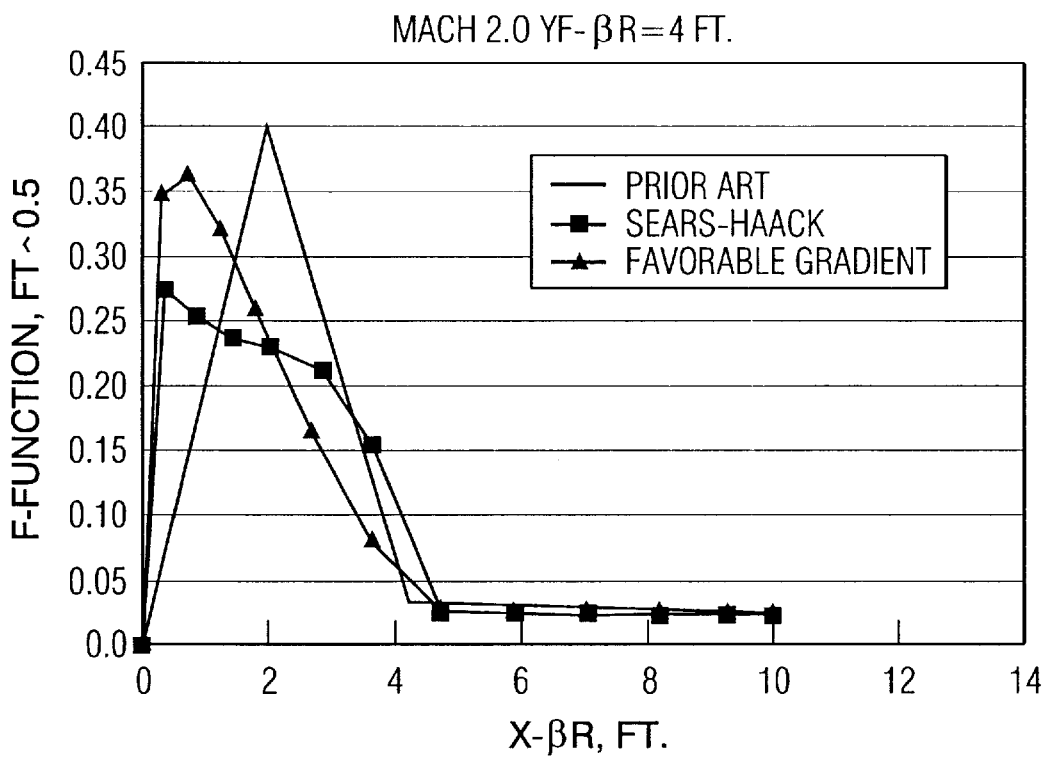
FIG. 28a is a graph including plots of F-function versus distance for improved nose bluntness shapes compared to prior art.
Figure 28B:
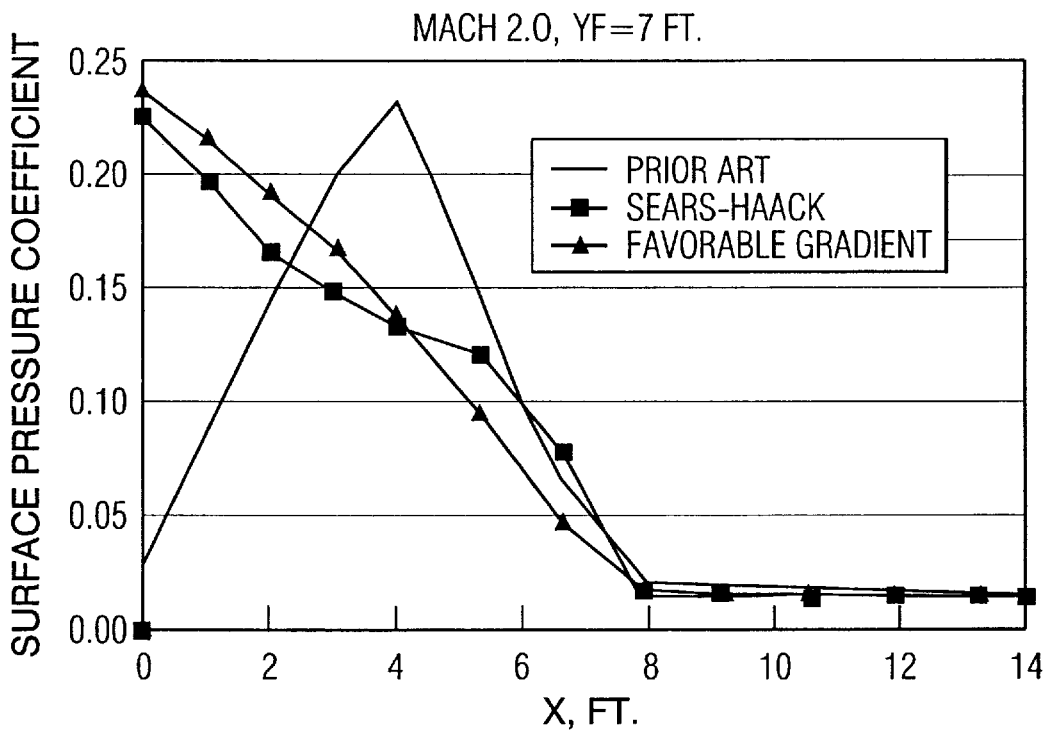
FIG. 28b is a graph including plots of surface pressure coefficient versus distance for improved nose bluntness shapes compared to prior art.
Figure 28C:
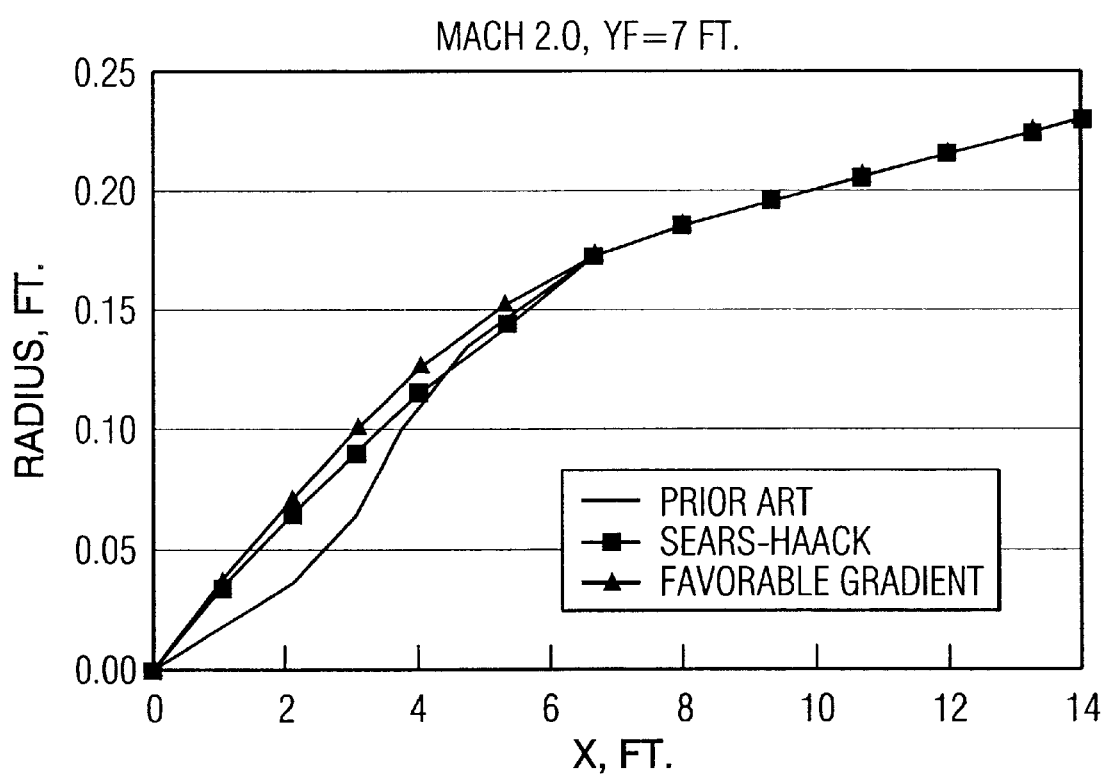
FIG. 28c is a graph including plots of radius versus distance for improved nose bluntness shapes compared to prior art.

An application of this procedure using a Sears-Haack distribution is also shown in FIGS. 28a–c. It has a slightly sloped F-function strength, a favorable pressure gradient (most favorable at the aft end of the relaxation length YF) and a blunter nose curvature without inflection. Further, it is 19% lower in wave drag than the prior art shown.

Another option is a nose with a constant favorable pressure gradient as labeled in FIGS. 28a–c. This shape has even greater nose bluntness and volume with still 15% lower wave drag than the prior art shown. Further the strong favorable pressure gradients from integrating boom minimization with the minimum drag and favorable gradient nose shapes may yield significant runs of laminar flow, further offsetting the low sonic boom bluntness drag with reduced skin friction drag. These alternate relaxed bluntness shapes produce minimum drag at shorter bluntness relaxation lengths, leading to lower minimized boom shock strengths.

A preferred nose shape of the present invention corresponds to a Sears-Haack shape connecting the nose to the rest of the boom minimized equivalent area distribution.

Figure 32:
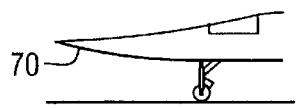
FIG. 32 is a side view of a portion of an aircraft including a cambered blunt nose in accordance with an embodiment of the present invention.

FIG. 32 is a side view of a portion of an aircraft including a cambered blunt nose 70 in accordance with an embodiment of the present invention. As shown in FIG. 32, the nose 70 has a blunt shape on its underside and defines a camber line that slopes upward toward the front of the aircraft.

Figure 33:
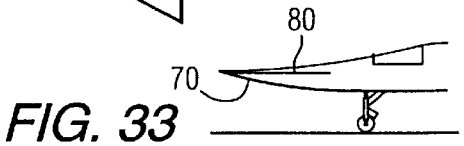
FIG. 33 is a side view of a portion of an aircraft including a blunt nose and canard with minimum drag shape above the canard and one-half the nose bluntness below, for low drag and minimized boom in accordance with an embodiment of the present invention.

Another way to reduce the drag associated with the nose bluntness is to only produce the strong shock below the vehicle. FIG. 33 is a side view of a portion of an aircraft including a blunt nose 70 and canard 80 with minimum drag shape above the canard and one-half the nose bluntness below, for low drag and minimized boom in accordance with an embodiment of the present invention. Having a canard 80 in the YF region, as schematically shown in FIG. 33, can do this. Only the nose 70 below the canard 80 needs to maintain half of the bluntness area. The area above the canard 80 can be distributed for minimum drag. Additionally, there is drag associated with the rapid decrease in pressure from the nose shock to the weak compression that follows. The canard 80 naturally forms such as expansion without need to rapidly inflect the area distribution. Alternately, the nose camber slope can be kinked slightly more trailing edge up at the YF location so that the area distribution does not have to rapidly inflect to generate the expansion to the following weak compression.

Achieving a minimized equivalent area distribution is difficult because so many other vehicle requirements are impacted anytime the area or lift distributions are changed. It is extremely computationally intensive to arrive at a design that meets all the constraints and requirements with anywhere close to optimum performance. Flexibility in the sonic boom minimization constraint would revolutionize low boom design capability. The following extensions to sonic boom minimization theory make this possible.

Figure 29A:
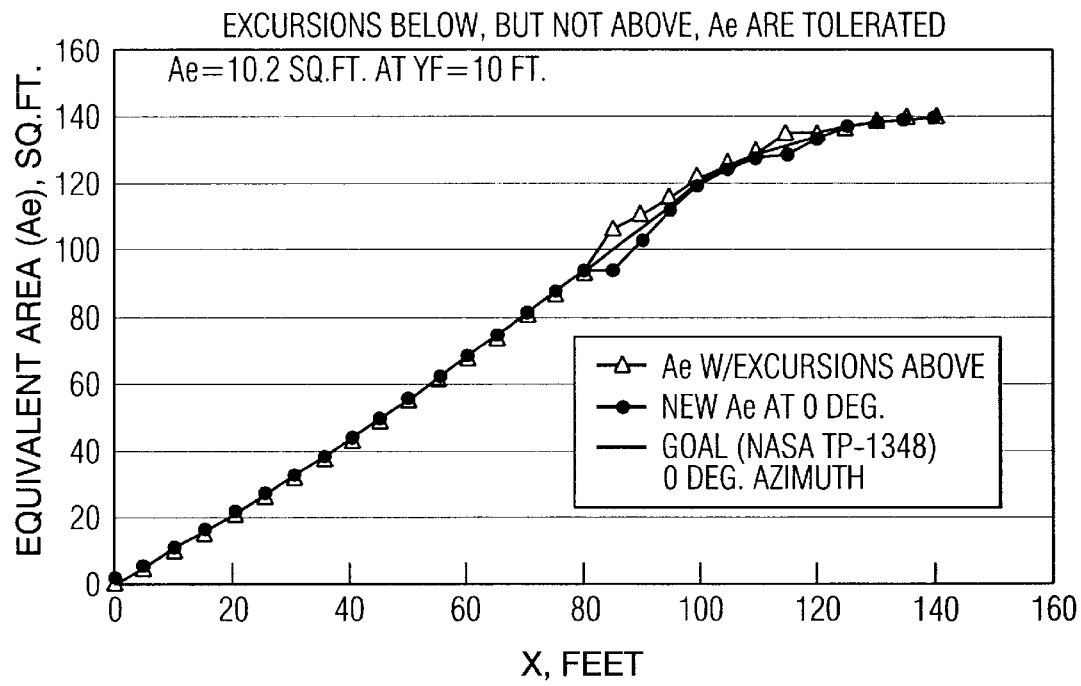
FIG. 29a is a graph including plots of equivalent area versus distance with excursions above and below a sonic boom minimized area goal.
Figure 29B:
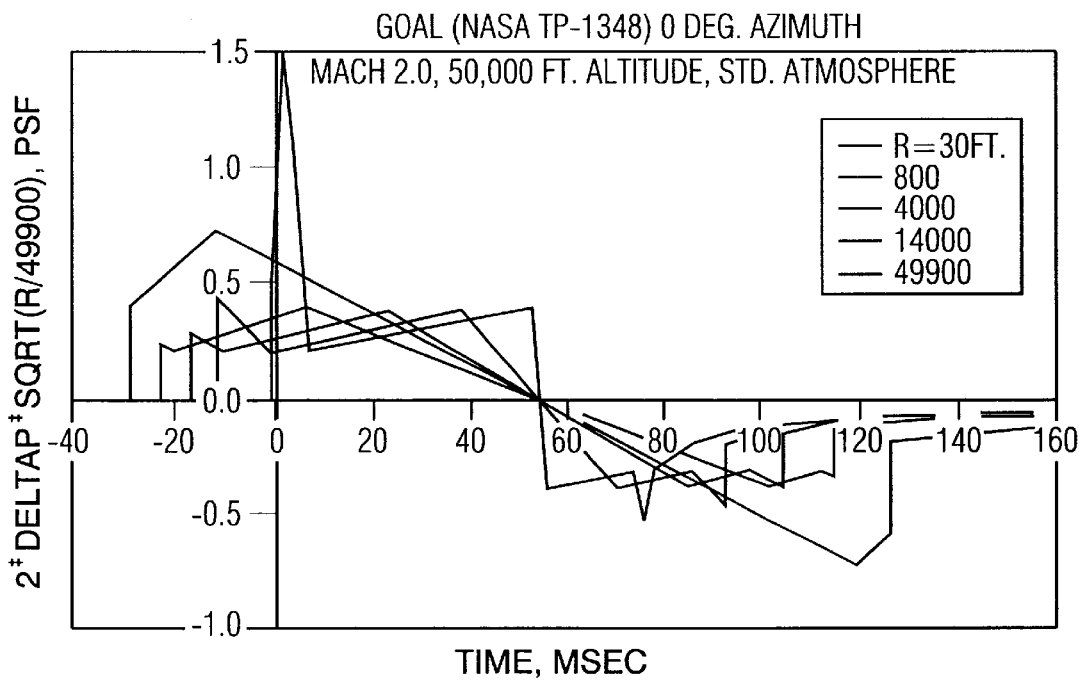
FIG. 29b illustrates the propagation of an ideal sonic boom minimized area goal.
Figure 29C:
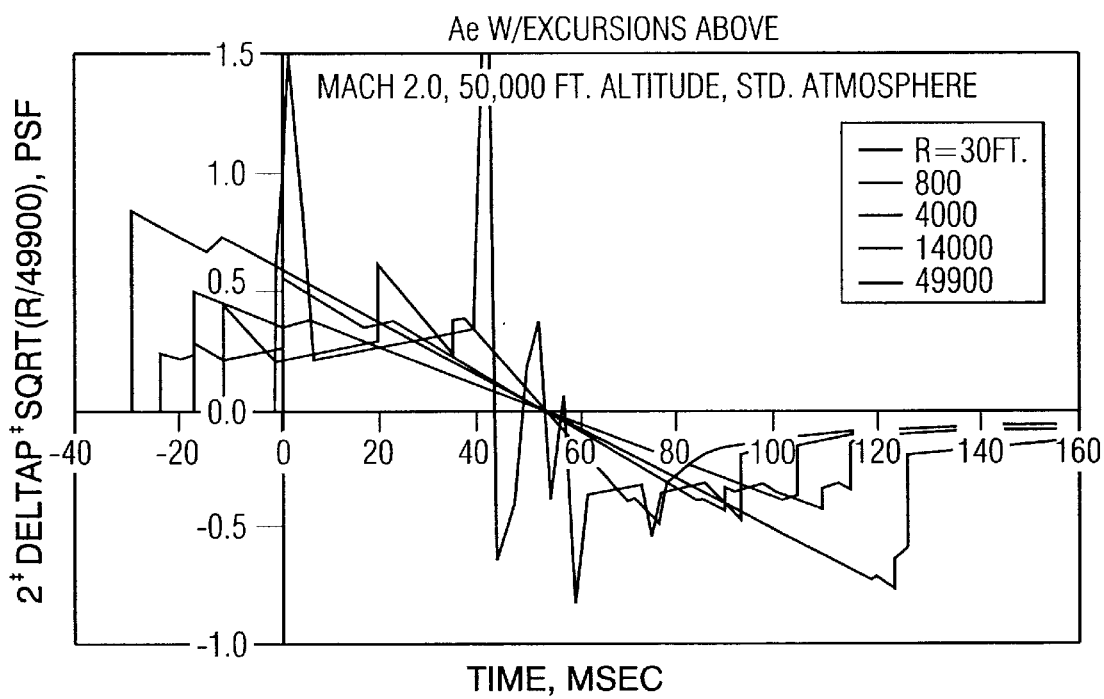
FIG. 29c illustrates the dramatic increase in shock strength due to excursions above the sonic boom minimized area goal.

Sonic boom minimization is still achieved if the equivalent area distribution has excursions below the Darden goal. The equivalent area distribution of the aircraft need only be equal to or less than the equivalent area goal distribution to achieve minimized sonic boom at the ground. Rather large equivalent area excursions can be tolerated if they are below the minimized distribution. For example, FIG. 29a shows a comparison propagation between a minimized (goal) equivalent area, with excursions above the goal area, and with excursions below the goal area. The propagations are plotted times the square root of distance over the square root of altitude to keep the pressure magnitude more constant for ease of comparison. The goal propagation (FIG. 29b) yields a minimum shock ground signature with 0.4 psf front and rear shock strengths. The propagation with excursions above the goal area (FIG. 29c) translates into an initial pressure at a distance of 30 feet with a large compression starting at 40 msec followed by an similar strength expansion at 45 msec and another compression at 55 msec followed by an similar expansion at 60 msec. The feet to msec conversion is nearly 2 to 1 at Mach 2.0. Due to the physics of propagation, the compression at 40 msec propagates faster, coalescing the entire front of the signature and doubling shock strength.

Figure 29D:
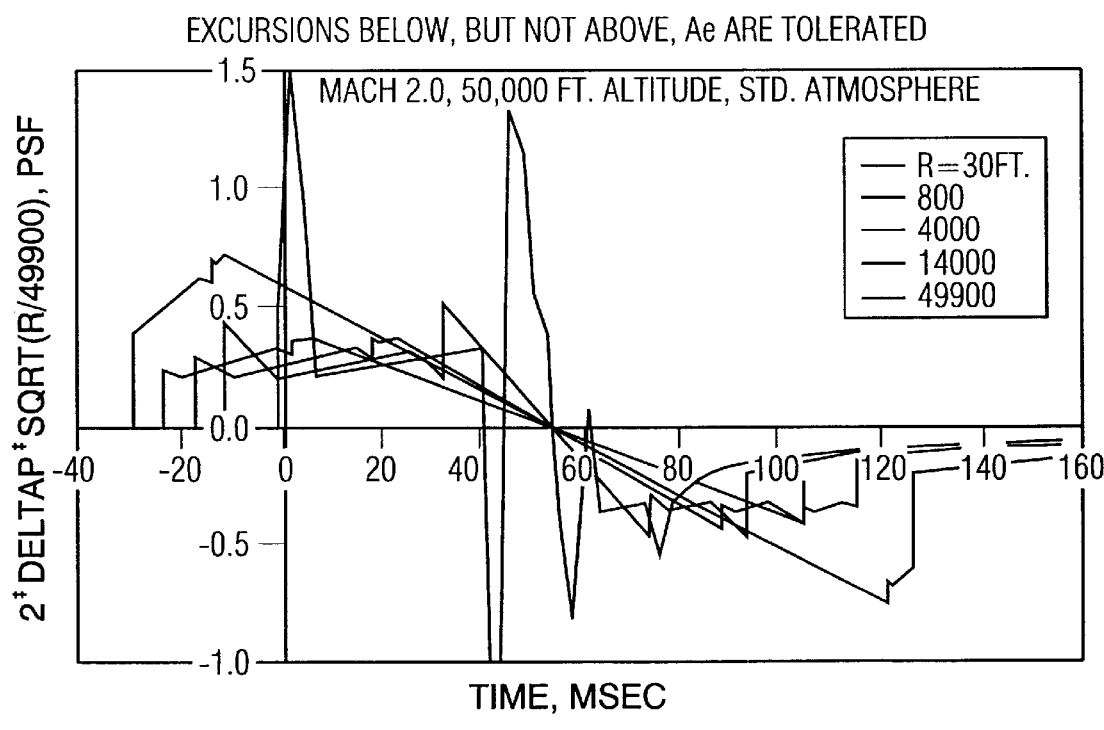
FIG. 29d illustrates the surprising lack of increase in shock strength due to excursions below the sonic boom minimized area goal.

The propagation with excursions below the goal area (FIG. 29d) translates into an initial pressure at a distance of 30 feet with expansions followed by similar strength compressions at the same locations as the previous case. This time the physics of the propagation cause the expansions followed by compressions to interact and cancel during propagation. At the ground, the tiny disturbance left is insignificant in loudness. Very strong compressions can therefore be cancelled if they are preceded by an equal and opposite expansion. This appears on an equivalent area plot as short excursions below the goal distribution.

Figure 30B:
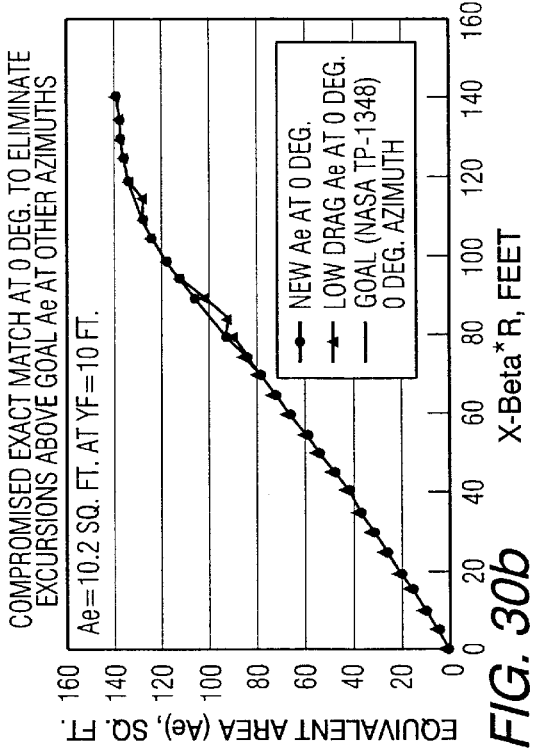
FIGS. 30b, 30d and 30f are graphs of equivalent area or ground overpressure at zero and 20 degrees of azimuth when the goal matching at zero degrees is compromised by excursions below the goal at zero degrees so that no excursions above the goal at 20 degrees remain, yielding minimized boom at both azimuths simultaneously.
Figure 30D:
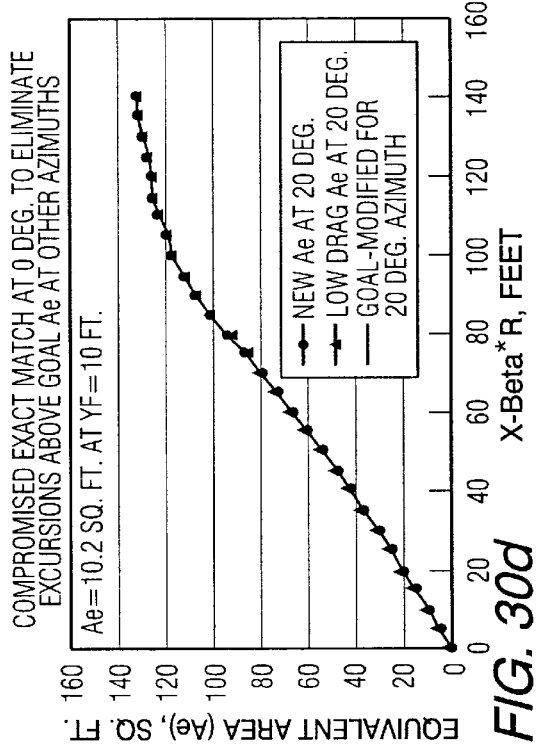
Figure 30A:
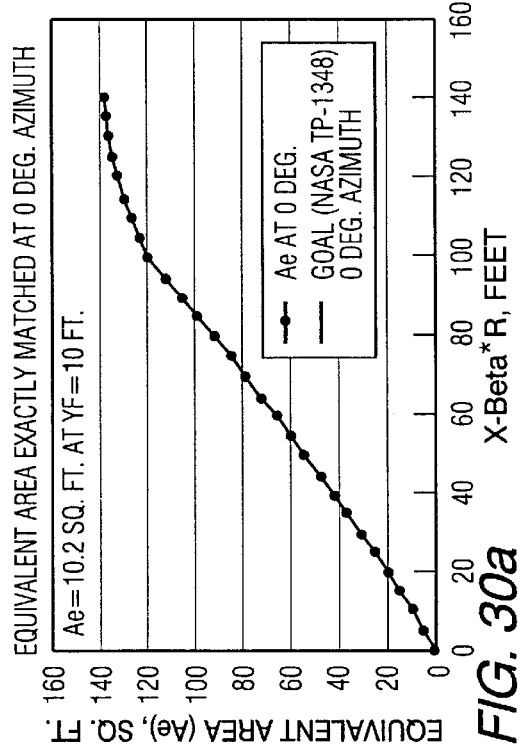
FIGS. 30a, 30c and 30e are graphs of equivalent area or ground overpressure at zero and 20 degrees of azimuth when the goal is matched at zero degrees, but no consideration was given for 20 degrees.
Figure 30C:
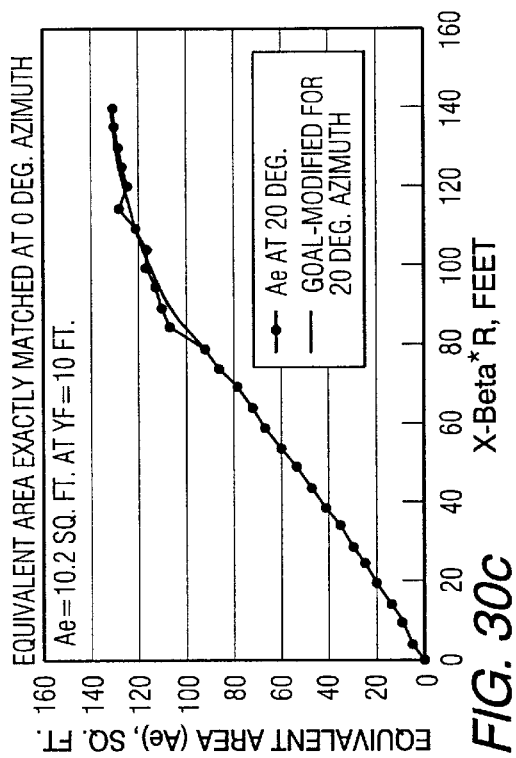
Figure 30E:
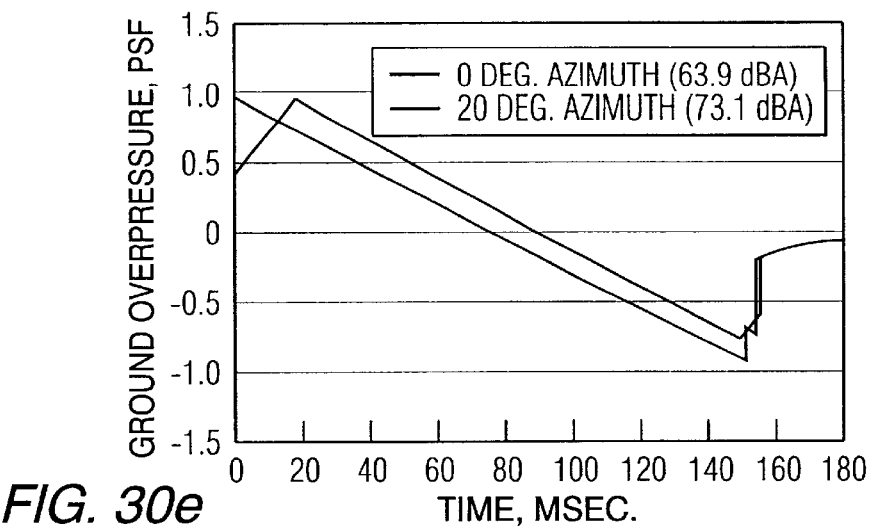
Figure 30F:
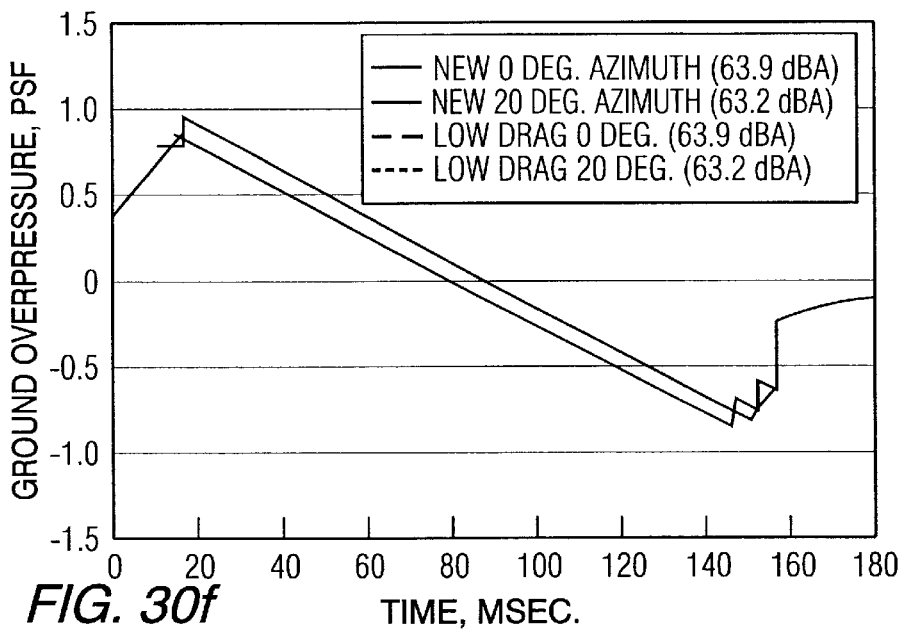

The significance of this flexible minimization is at least threefold. Prediction uncertainty can be compensated for by lowering the equivalent area where appropriate. The minimum drag area distribution does not have to be completely compromised to meet the equivalent area goal exactly. Excursion below can be allowed simply to reduce drag. Significantly, more than one minimization constraint can be met by allowing excursions below. For example, a shortcoming of the Seebass, George, Darden theory is that it only describes minimization directly below the aircraft. FIG. 30a illustrates a vehicle that exactly matches the goal minimization area directly under the aircraft (0 degrees azimuth). As is typical, when the Mach angle is changed to look at 20 degrees azimuth equivalent area, the distribution has changed. In this case, the wing mounted nacelle on the near side shifts forward, resulting in two excursions above the minimized distribution. The excursion above the goal at 20 degrees azimuth leads to front shock coalescence and an increase in loudness of 10 dBA. By simply reducing the Mach angle area at 20 degrees azimuth until the area is everywhere below the goal, both minimization requirements can be simultaneously met. Zero degrees azimuth now is compromised with excursions only below the minimization goal and 20 degrees azimuth also retains some slight excursions below. The ground signature for the compromised redesign that meets both minimization conditions has the same loudness at 0 degrees azimuth (the same distribution shown in FIG. 29d earlier) and slightly lower loudness at 20 degrees.

Further, an area reducing fairing of the previous area reduction was also applied to the design to lower drag. It resulted in ground signatures and loudness identical to the previous result that met both constraints. Extending this example, the entire carpet of the aircraft can be minimized by specifying minimization goals every 10 degrees until cut-off and modifying the area distribution until only excursions below remain. Moreover, different flight conditions can be simultaneously considered. Climb minimization goals every 0.2 in Mach number can be added. Maneuver conditions of 1.3 g turns and 1.2 g pull-up can also be simultaneously considered for their incremental effect. A minimum shock shape can be considered for a 1.3 g turn and a part ramp/part flat-top signature (FIG. 25) can be simultaneously applied at the 1.0 g condition to reduce building response. In summary, the entire flight envelope can be minimized.

Conventional theory of sonic boom minimization considers Mach angle area distributions in only one dimension of length. To reduce the minimized sonic boom further, the weight must be reduced or the minimization length increased. Since minimized area distributions only have increasing area slopes, the minimization length ends where the lift ends. The tail-braced wing design of the present invention uses non-planar geometry to maximize the lifting length, and thereby, the minimization length.

Figure 31A:
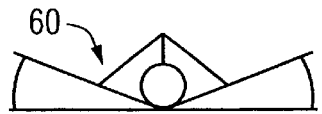
FIG. 31a is a schematic front view of a tail-braced dihedral wing aircraft in accordance with an embodiment of the present invention.
Figure 31B:
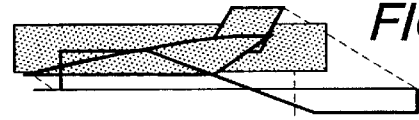
Figure 31C:
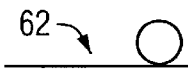
FIG. 31c is a schematic front view of a planer wing aircraft.
Figure 31D:
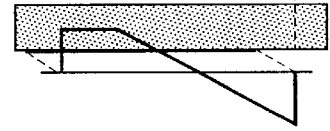
FIG. 31d illustrates a much louder shaped sonic boom profile for the aircraft of FIG. 31c with a planer wing.

FIG. 31a is a schematic front view of a tail-braced dihedral wing aircraft 60. FIG. 31b illustrates non-planar low sonic boom advantages for the aircraft 60 of FIG. 31a. FIG. 31c is a schematic front view of a planar wing aircraft 62. FIG. 31d illustrates a much louder shaped sonic boom profile for the planar wing aircraft 62 of FIG. 31c. FIGS. 31a and 31b schematically illustrate how the bracing tail of the dihedral aircraft 60 carries lift at a higher elevation, which is equivalent to a much longer minimization length for the pressures propagating below the aircraft. Further, the lift carried by the bracing tail to the trailing edge of the vehicle, creates a lower pressure on the upper surface of the tail that causes the expansion behind the vehicle needed to meet a sonic boom minimized pressure distribution's aft expansion spike. Additionally, carrying the lift at a higher elevation makes the lift appear farther back for sonic boom propagating below the vehicle (X-BetaR) without moving the center-of-pressure (lift) farther back, allowing trim and sonic boom requirements to be more easily met.

Figure 34A:
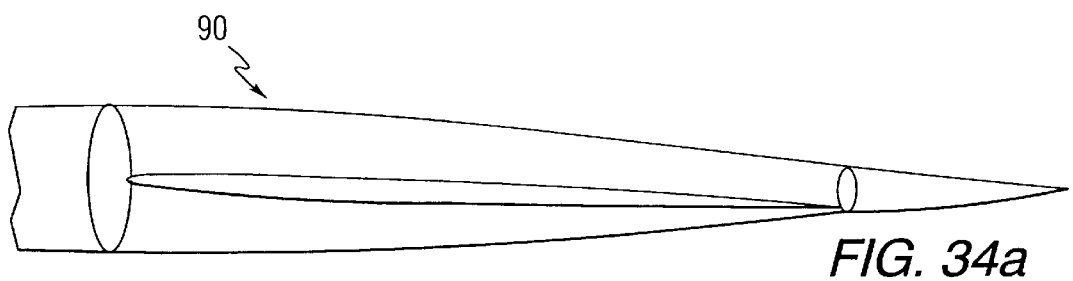
FIG. 34a is a side view of a portion of an aircraft illustrating a wing-fuselage configuration where the area below the wing decreases more than the area above the wing. The wing shielding causes the greater area above the wing to be lost for the sonic boom propagating below the vehicle.
Figure 34B:
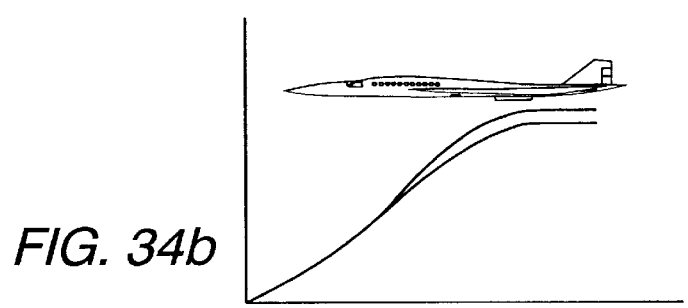
FIG. 34b shows on an equivalent area plot how the loss of the greater area above the wing in FIG. 34a is like hiding some of the vehicle weight for purposes of calculating sonic boom propagation under the vehicle.

Another non-planar effect can be employed to hide some of the vehicle weight. If the area of the fuselage below the lifting surface decreases more than the area above the lifting surface, the sonic boom propagating below the vehicle will act as if the area decreased the greater amount both above and below the vehicle. FIG. 34a is a side view of a portion of an aircraft 90 illustrating a wing-fuselage configuration where the area below the wing decreases more than the area above the wing. The wing shielding causes the greater area above the wing to be lost for the sonic boom propagating below the vehicle. FIG. 34b shows on an equivalent area plot how the loss of the greater area above the wing in FIG. 34a is like hiding some of the vehicle weight for purposes of calculating sonic boom propagation under the vehicle. The greater volume above the lifting surface will in effect be lost as the FIG. 34b equivalent area plot shows, resulting in a lower total equivalent area. A disadvantage of the configuration in FIGS. 34a and 34b is that the greater decrease in area below the lifting surface results in some loss of lift on the surface, requiring a greater angle of attack and thereby increased drag.

Figure 35A:
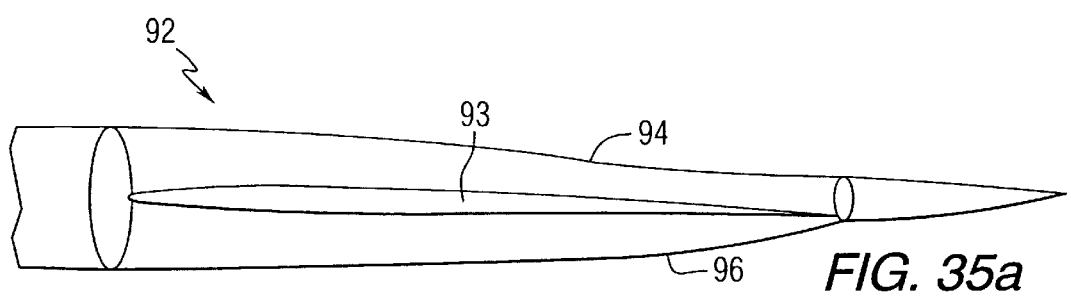
FIG. 35a and 35b illustrate how confining the greater area decrease below the wing as far aft as practical reduces the area of the wing where lift is reduced and is well positioned to help cancel the pressure disturbance of a propulsion system.
Figure 35B:
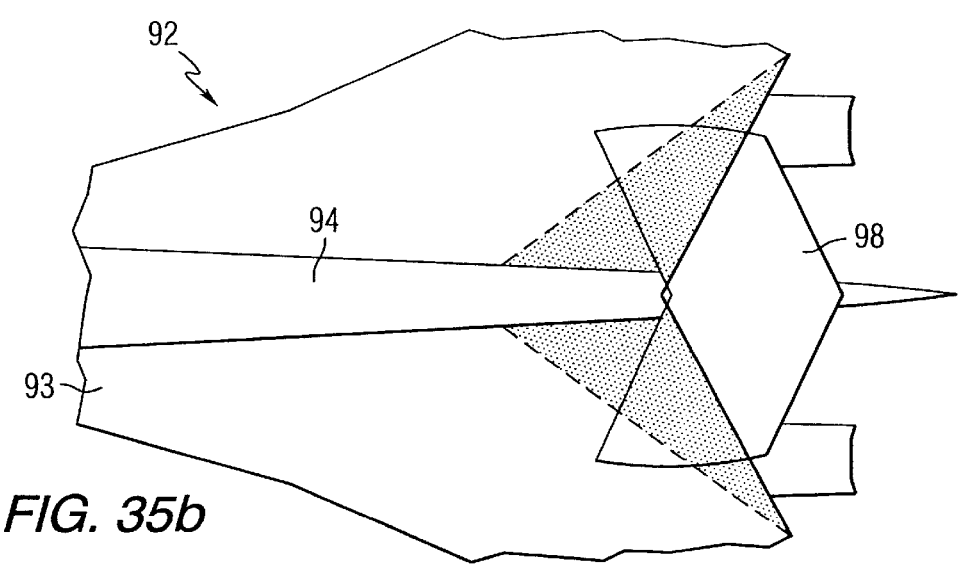

To minimize this effect, the design schematically illustrated in FIGS. 35a and 35b confines the greater decrease in area below the surface of the wing as far aft as possible so only a small portion of the lifting surface is affected. The aircraft 92 includes a wing 93 and bracing tail 98. The aircraft fuselage shown in FIGS. 35a and 35b has areas above 94 and below 96 the wing 93 which decrease toward the rear of the aircraft. There is a greater area decrease below 96 the wing in comparison with the area decrease above 94 the wing. The area decrease below 96 the wing is positioned relatively far aft in order to reduce the area of the wing where lift is reduced. The shape of the area below 96 the wing also helps cancel pressure disturbances of a propulsion system. The expansion induced on the aft of the lifting surface is well positioned in the embodiment shown in FIGS. 35a and 35b to help cancel the pressure disturbance of a propulsion system cantilevered off the bottom of the surface's rear spar, facilitating a sonic boom minimized distribution.

FIGS. 36a–36c show an embodiment of an aircraft 810 incorporating one of the many possible synergistic combinations of a tail-braced wing with supersonic drag reductions and reduced sonic boom. The aircraft 810 includes a wing 820, fin 830, bracing tail 840, bump 823, and engine nacelle 850 similar to the embodiment shown in FIGS. 1 and 16a–16c. In addition, the fuselage 812 has a minimum drag relaxed nose bluntness camber (as shown in the embodiment of FIG. 32), and may have a fuselage with hidden area (as shown in the embodiment of FIG. 35a). A canard 80, as shown in phantom in FIG. 36a, may optionally be provided at the nose of the aircraft 810. The canard 80 is preferably swept back less than the Mach cone angle. Furthermore, the aircraft 810 may be provided with empenage, wing reflexing and sonic boom minimization at multiple azimuths, as described herein. The drag reducing elements help in meeting the smooth equivalent area distribution for sonic boom minimization.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What is claimed is:

1. An aircraft comprising:
   a fuselage
   a swept-back wing having a wing root connected to the fuselage;
   a fin mounted on an upper surface of the fuselage at a rear portion of the aircraft; and
   a bracing tail including:
      a bracing tail tip connected to the wing inboard of a tip of the wing; and
      a bracing tail root connected to the fin at a higher point vertically than the connection between the wing root and the fuselage,
   wherein the connection between the wing and the bracing tail tip comprises means for maintaining a substantially constant area distribution.

2. The aircraft of claim 1, wherein the wing and bracing tail are connected in tandem with a partial overlap of their surfaces.

3. The aircraft of claim 1, wherein the means for maintaining a substantially constant area distribution comprises at least one structural member extending from the wing and/or bracing tail.

4. The aircraft of claim 3, wherein the structural member is located at tapered regions of the wing and bracing tail.

5. The aircraft of claim 1, wherein the connection between the wing and the bracing tail comprises a raised portion of the wing.

6. The aircraft of claim 1, wherein the bracing tail tip is connected inboard of the wing tip at a point that is greater than 50 percent of the distance from the wing root to the wing tip, and the bracing tail root is connected to the fin at a point that is greater than 20 percent of the distance from the fin root to the fin tip.

7. The aircraft of claim 1, wherein the bracing tail tip is connected inboard of the wing tip at a point that is from about 20 to about 80 percent of the distance from the wing root to the wing tip, and the bracing tail root is connected to the fin at a point that is greater than 20 percent of the distance from the fin root to the fin tip.

8. The aircraft of claim 1, wherein the wing and bracing tail forms a substantially triangular structure which connects an outboard edge of the bracing tail, a rear spar of the wing, and an outboard rear spar of the bracing tail.

9. The aircraft of claim 1, wherein the wing comprises a leading edge swept back greater than a Mach cone angle, and a trailing edge swept back less than the Mach cone angle.

10. The aircraft of claim 9, wherein the bracing-tail comprises a leading edge and a trailing edge swept forward less than the Mach cone angle.

11. The aircraft of claim 10, wherein the bracing tail comprises substantially no tail taper.

12. The aircraft of claim 1, wherein the bracing tail carries less than 25 percent of the lift of the aircraft.

13. The aircraft of claim 1, wherein the fin comprises a rear spar connected to a front spar of the bracing tail staggered in tandem to maintain a substantially constant area distribution.

14. The aircraft of claim, 1, wherein the fin tip overhangs a leading edge of the bracing tail and/or overhangs a trailing edge of the bracing tail.

15. The aircraft of claim 1, wherein the bracing tail is connected to the fin at a mid-chord position where the fin reaches maximum thickness at a chord between leading and trailing edges of the bracing tail.

16. The aircraft of claim 1, wherein the fin comprises a rudder in an aft overhang region below the bracing tail and extending above the bracing tail and forward toward a maximum thickness region of the bracing tail ahead of a pivot axis of the rudder.

17. The aircraft of claim 1, wherein the connection region between the fin and bracing tail comprises at least one area ruling body extending ahead of and/or behind the connection.

18. The aircraft of claim 1, wherein the wing is a dihedral wing.

19. The aircraft of claim 1, wherein the wing comprises a reduced dihedral or wing anhedral outboard of the bracing tail connection.

20. The aircraft of claim 1, wherein the wing has a reduced sweep angle outboard of the bracing tail connection.

21. The aircraft of claim 1, wherein the aircraft comprises a propulsion system mounted underneath the wing below the connection between the wing and bracing tail.

22. The aircraft of claim 21, wherein the connection between the wing and bracing tail comprises a raised portion of the wing.

23. The aircraft of claim 21, wherein the propulsion system is cantilevered off an aft end of the wing supported by the bracing tail.

24. The aircraft of claim 21, wherein the propulsion system comprises a front engine mount hung off the connection between the wing and bracing tail, and an aft engine mount hung off the bracing tail tip.

25. The aircraft of claim 1, wherein the aircraft comprises a propulsion system mounted on top of the wing at the connection between the wing and bracing tail.

26. The aircraft of claim 25, wherein a lower surface of the wing below the propulsion system comprises a downwardly extending bump.

27. The aircraft of claim 25, wherein the propulsion system is cantilevered off an aft end of the wing supported by the bracing tail.

28. The aircraft of claim 1, wherein the aircraft comprises a propulsion system mounted on an aft portion of the fuselage which generates a shock wave ahead of a trailing edge of the wing.

29. The aircraft of claim 1, wherein the aircraft comprises a propulsion system mounted on an aft portion of the fuselage which generates a shock wave behind a trailing edge of the wing.

30. The aircraft of claim 1, wherein the aircraft comprises a blunt nose having a camber line that slopes upward toward the front of the aircraft.

31. The aircraft of claim 30, wherein the blunt nose comprises a canard.

32. The aircraft of claim 1, wherein the aircraft comprises:
lift and trim surfaces; and
a propulsion system capable of generating a non-axisymnetric supersonic pressure disturbance that impacts the lift and/or trim surfaces, wherein the lift and/or trim surfaces define a camber line having a slope selected to cancel about one half of the supersonic pressure disturbance.

33. The aircraft of claim 1, wherein the aircraft has a combined lift/area that produces a shaped sonic boom minimized distribution.

34. An aircraft comprising:
a fuselage;
a swept-back wing having a wing root connected to the fuselage;
a fin having a fin root mounted on an upper surface of the fuselage at a rear portion of the aircraft; and
a bracing tail having:
a bracing tail tip connected inboard of a tip of the wing at a point that is greater than 50 percent of the distance from the wing root to the wing tip; and
a bracing tail root connected to the fin at a point that is greater than 20 percent of the distance from the fin root to a tip of the fin.

35. The aircraft of claim 34, wherein the wing and bracing tail are connected in tandem with a partial overlap of their surfaces.

36. The aircraft of claim 34, wherein the means for maintaining a substantially constant area distribution comprises at least one structural member extending from the wing and/or bracing tail.

37. The aircraft of claim 36, wherein the structural member is located at tapered regions of the wing and bracing tail.

38. The aircraft of claim 34, wherein the connection between the wing and the bracing tail comprises a raised portion of the wing.

39. The aircraft of claim 34, wherein the connection between the wing and bracing tail comprises means for maintaining a substantially constant area distribution.

40. The aircraft of claim 34, wherein the bracing-tail comprises a leading edge and a trailing edge swept forward less than the Mach cone angle.

41. The aircraft of claim 34, wherein the bracing tail carries less than 25 percent of the lift of the aircraft.

42. The aircraft of claim 34, wherein the aircraft comprises a propulsion system mounted underneath the wing below the connection between the wing and bracing tail.

43. The aircraft of claim 34, wherein the aircraft comprises a propulsion system mounted on top of the wing at the connection between the wing and bracing tail.

44. The aircraft of claim 34, wherein the aircraft comprises a blunt nose having a camber line that slopes upward toward the front of the aircraft.

45. The aircraft of claim 34, wherein the aircraft comprises:
lift and trim surfaces; and
a propulsion system capable of generating a non-axisymmetric supersonic pressure disturbance that impacts the lift and/or trim surfaces, wherein the lift and/or trim surfaces define a camber line having a slope selected to cancel about one half of the supersonic pressure disturbance.

46. The aircraft of claim 34, wherein the aircraft has a combined lift/area that produces a shaped sonic boom minimized distribution.

47. A supersonic aircraft comprising:
a fuselage;
a swept-back wing connected to the fuselage; a fin connected to the fuselage; and
a bracing tail connected to the wing and fin,
wherein the fuselage comprises a blunt nose having a camber line that slopes upward toward the front of the aircraft.

* * * * *